United States Patent
DeSalvo et al.

(10) Patent No.: US 11,747,462 B1
(45) Date of Patent: Sep. 5, 2023

(54) DEVICES, SYSTEMS, AND METHODS FOR RADAR-BASED ARTIFICIAL REALITY TRACKING

(71) Applicant: META PLATFORMS TECHNOLOGIES, LLC, Menlo Park, CA (US)

(72) Inventors: Riccardo DeSalvo, Los Angeles, CA (US); Giuseppe Castaldi, Apice (IT); Andrea Cusano, Caserta (IT); Vincenzo Galdi, Benevento (IT); Paolo Mattera, Benevento (IT); Roberto Parente, Cerreto Sannita (IT); Fereydoun Daneshgaran, La Crescenta, CA (US); Joseph Minh Tien, Alhambra, CA (US); Dustin Jeffery Gordon Krogstad, Chino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 604 days.

(21) Appl. No.: 16/703,310

(22) Filed: Dec. 4, 2019

(51) Int. Cl.
*G01S 13/58* (2006.01)
*G01S 13/89* (2006.01)
*G06T 19/00* (2011.01)
*G06F 3/01* (2006.01)
*G06V 20/20* (2022.01)

(52) U.S. Cl.
CPC ............ *G01S 13/584* (2013.01); *G01S 13/89* (2013.01); *G06F 3/011* (2013.01); *G06T 19/006* (2013.01); *G06V 20/20* (2022.01)

(58) Field of Classification Search
CPC ........ G01S 13/584; G01S 13/89; G06F 3/011; G06T 19/006; G06V 20/20
See application file for complete search history.

(56) References Cited

U.S. PATENT DOCUMENTS

| | | | |
|---|---|---|---|
| 7,982,661 B2 * | 7/2011 | Beasley | G01S 7/354 342/194 |
| 10,324,530 B2 * | 6/2019 | Keller | G06F 3/016 |
| 10,872,584 B2 * | 12/2020 | Jones | G06F 3/017 |
| 11,256,335 B2 * | 2/2022 | Poupyrev | G01S 7/4004 |
| 2015/0029050 A1 * | 1/2015 | Driscoll | H01Q 3/30 342/5 |

(Continued)

*Primary Examiner* — Peter M Bythrow
(74) *Attorney, Agent, or Firm* — Greenberg Traurig, LLP

(57) ABSTRACT

The disclosed radar system may include a radar mechanism comprising a transmitter and at least one receiver. The radar system may also include a signal generator that generates a frequency-modulated radar signal. In addition, the radar system may include at least one frequency multiplier that, after multiplying a frequency of the frequency-modulated radar signal by a certain factor, synchronously passes the frequency-modulated radar signal to (1) the transmitter to be transmitted to at least one transponder located on a wearable device and (2) a processing device communicatively coupled to the receiver. The processing device may (1) detect a signal returned to the receiver from the transponder in response to the frequency-modulated radar signal and (2) calculate a distance between the transponder and the receiver based at least in part on an analysis of the signal returned from the transponder and the frequency-modulated radar signal received from the frequency multiplier.

19 Claims, 16 Drawing Sheets

(56) References Cited

U.S. PATENT DOCUMENTS

| | | | |
|---|---|---|---|
| 2016/0026253 A1* | 1/2016 | Bradski | H04N 13/128 |
| | | | 345/8 |
| 2016/0363659 A1* | 12/2016 | Mindell | G01S 13/66 |
| 2017/0074974 A1* | 3/2017 | Rao | G01S 13/89 |
| 2018/0157330 A1* | 6/2018 | Gu | G01S 7/415 |
| 2018/0329031 A1* | 11/2018 | Cheung | G01S 13/34 |
| 2021/0270951 A1* | 9/2021 | Yoshizawa | H04W 72/12 |

* cited by examiner

DEVICES, SYSTEMS, AND METHODS FOR RADAR-BASED ARTIFICIAL REALITY TRACKING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
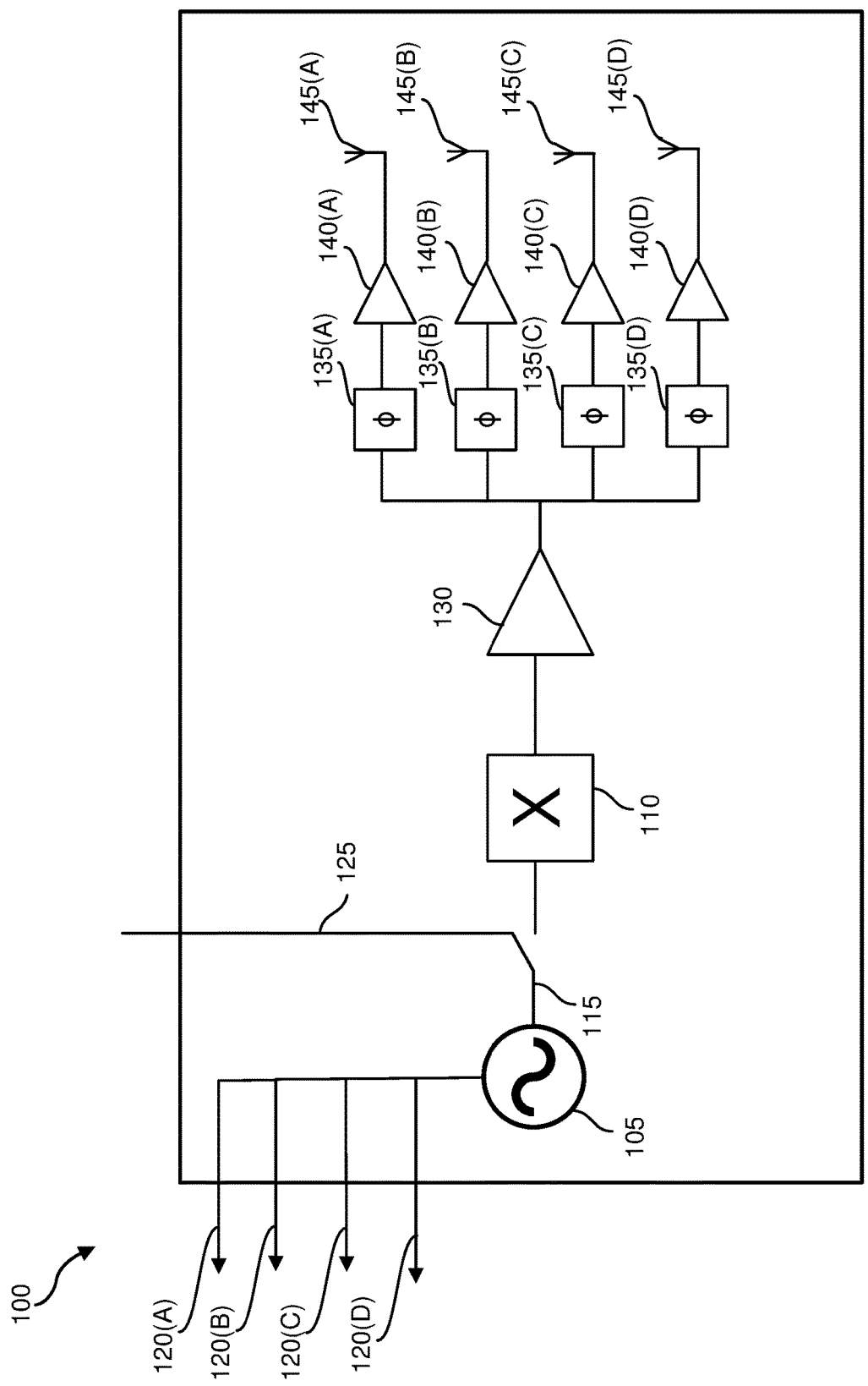
FIG. 1 is an illustration of an exemplary apparatus that may be used in connection with embodiments of this disclosure.

While the exemplary embodiments described herein are susceptible to various modifications and alternative forms, specific embodiments have been shown by way of example in the background and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION OF EXEMPLARY EMBODIMENTS

Over the last several years, artificial reality systems have revolutionized the way people experience various kinds of digital media. For example, an artificial reality headset may allow users to experience realistic, immersive virtual environments while playing video games, during flight simulation training, or even when interacting with co-workers around the globe. In addition to such artificial-reality applications, wearable artificial reality devices may also enable users to augment reality and/or combine certain aspects of reality with those of the virtual world.

Despite significant advances in such technology, traditional artificial reality systems may still have certain deficiencies that negatively impact the overall user experience. For example, some artificial reality systems may struggle to accurately and/or quickly track the position of a user and/or an artificial reality device worn by the user. As such, the artificial reality system may be unable to update virtual content (such as graphics or haptic feedback) with sufficient speed and/or resolution.

The present disclosure, therefore, identifies and addresses a need for additional devices, systems, and methods for radar-based artificial reality tracking. In particular, these devices, systems, and methods may determine the current location of all or a portion of a user by calculating the distance between one or more radar devices and one or more transponders that are located on and/or nearby the user. As will be explained in greater detail below, these devices, systems, and methods may provide numerous features and benefits.

The disclosed radar systems may utilize various types of radar to track or determine the position, orientation, and/or physical location of a wearable artificial reality device and/or a user of an artificial reality system. In particular, the disclosed radar systems may utilize frequency-modulated continuous-wave (FMCW) radar. In an FMCW radar system, a radar device may transmit a frequency-modulated signal (e.g., a signal that sweeps between and/or within a certain range of frequencies). In one embodiment, the frequency of an FMCW signal may vary linearly over a fixed period of time. As an example, the frequency of an FMCW signal may linearly sweep between 120 gigahertz and 130 gigahertz over a time period of 10 milliseconds.

After transmitting an FMCW signal, a radar system may receive a reflected, echoed, or otherwise returned signal from a target that received and/or encountered the FMCW signal. Because the frequency of the FMCW signal changes over time, the instantaneous frequency of the returned signal may differ from the instantaneous frequency of the FMCW signal at the point in time that the returned signal is received at the radar system. For example, the instantaneous frequency of the returned signal may be offset by a certain amount relative to the FMCW signal. This frequency offset may be related to and/or a result of the time required for the FMCW signal to travel from the radar system to the target and back to the radar system. Because the frequency of the FMCW signal has a known rate of change, the radar system may determine the range of (e.g., distance to) the target based at least in part on the frequency offset of the returned signal.

The radar system may identify the frequency offset of the returned signal in a variety of ways. In one embodiment, the radar system may combine (e.g., multiply) the returned signal and the original FMCW signal (which may be referred to as a reference signal). The radar system may then determine the frequency components of the combined signal. In some examples, the frequency components may include an offset frequency corresponding to the amount by which the frequency of the returned signal has shifted. This offset frequency may be referred to as a beat frequency. In some embodiments, the value of the beat frequency may be directly proportional to the range of the target. Accordingly, extracting the beat frequency from the combined signal may enable the radar system to determine the range of the target.

The disclosed radar systems may determine the range of a variety of types of targets. In one example, a radar system may determine the range of passive targets (e.g., targets that simply reflect signals and do not actively transmit signals). Examples of passive targets may include a body part of a user, a wall, and/or a piece of furniture. In other examples, the disclosed radar systems may determine the range of active targets (e.g., targets that repeat, transmit, and/or modify received signals). Examples of active targets may include repeaters and/or transponders.

Utilizing active targets in addition to or instead of passive targets may provide a variety of benefits and advantages. For example, an active target may be capable of amplifying an FMCW signal before returning the FMCW signal to a radar device, thereby increasing the amplitude and/or improving the quality of the FMCW signal. In addition, an active target (such as a transponder) may generally be smaller in size than a passive target (such as a fingertip). For example, the transponders utilized in the disclosed radar systems may have a diameter of several millimeters. Due to their small and/or finite size, active targets may have a smaller area of reflective surfaces and may therefore provide returned signals with cleaner and/or more precise frequency profiles than passive targets.

Furthermore, a transponder or other active target may return a received FMCW signal that has an intentional (e.g., predetermined) offset frequency. For example, before returning an FMCW signal, a transponder may shift the frequencies of the FMCW signal by a certain amount (e.g., 1 megahertz, 2 megahertz, etc.). Such an intentional frequency offset within a returned signal may enable a radar system to identify a particular transponder that returned the signal (e.g., from within a group of transponders that each shift the frequency of returned signals by a different amount). In addition, an intentional frequency offset may reduce the amount of noise introduced into a returned signal by electromagnetic interference and/or ambient clutter (e.g., objects surrounding a transponder).

The radar systems disclosed herein may track and/or determine the position, orientation, and/or physical location of any type or form of wearable artificial reality device, including headsets, head-mounted displays, helmets, neckbands, wristbands, belts, ankle bands, and/or gloves. In some examples, a radar system may include multiple types of wearable artificial reality devices. For example, a radar system may include a headset worn on a user's head and a glove worn on the user's hand. In this example, the radar system may track changes in the relative distance between the headset and portions of the glove. Specifically, a radar device secured to the headset may periodically determine the distance between the radar device and one or more transponders secured to the glove. Additionally or alternatively, the radar system may determine a location of the glove and/or the headset within a physical environment surrounding the user.

The radar systems disclosed herein may utilize information about the position, orientation and/or physical location of a wearable artificial reality device in a variety of ways. In one example, a radar system may pass information about a current position of the device (or a change in the position of the device) to an artificial reality system to facilitate modifying one or more virtual components of the artificial reality system. Specifically, based on this information, the artificial reality system may adjust the location at which the user perceives a portion of virtual content (such as a graphic or haptic feedback) to account for the current (e.g., updated) position of the wearable artificial reality device. Additionally or alternatively, the artificial reality system may update a remote view of all or a portion of the user as the user is perceived, via radar, within their physical environment.

In some embodiments, the disclosed radar systems may be utilized in applications beyond artificial reality or similar applications (such as virtual reality and/or augmented reality). For example, these radar systems may be utilized in applications involving the control of an apparatus (such as an electronic device, a data input mechanism, a piece of machinery, a vehicle, etc.) using one or more body parts or gestures.

In some examples, a radar system may include multiple transponders. All or a portion of these transponders may be secured to a wearable device worn by a user. For example, an artificial reality glove may include a transponder corresponding to each of a user's fingertips, a transponder corresponding to each of the user's knuckles, and additional transponders corresponding to various locations on the user's hands, palms, and/or fingers. Incorporating a large number of transponders into a wearable device may increase the resolution with which an artificial reality system is capable of tracking the posture of a user's limbs and/or detailed movements of the wearable device.

Similarly, a radar system may include multiple radar devices. For example, the radar system may include at least one radar transmitter that transmits frequency-modulated radar signals. The radar system may also include at least one radar receiver that receives signals returned from transponders in response to frequency-modulated radar signals. In some embodiments, the radar devices within a radar system may be secured to a wearable device worn by a user (e.g., a different wearable device than the device that secures a set of transponders). Additionally or alternatively, the radar devices may be secured at a stationary location within the physical environment surrounding the user. In one example, a radar system may include a radar device that has one transmitter and multiple receivers. These components may be secured in any pattern and/or configuration that facilitates three-dimensional localization of a transponder. For example, the radar system may include an artificial reality headset equipped with a centrally-located transmitter and three or more receivers surrounding the transmitter (e.g., the receivers may be located near each of the user's ears and near the back of the user's head).

In some examples, each of the transmitters, receivers, and/or receiver-coupled devices within a radar system may receive the same frequency-modulated radar signal. For example, a signal generator may generate the frequency-modulated radar signal and then pass the radar signal to the transmitter to be transmitted to a set of transponders. The signal generator may also pass the radar signal to a processing device coupled to each receiver to be used as a reference signal for calculating beat frequencies associated with signals received by the receivers. As will be explained in greater detail below, embodiments of the instant disclosure may include one or more components to ensure and/or maximize the integrity and/or strength of the frequency-modulated radar signal received by each component. For example, a signal generator may generate a frequency-modulated radar signal with a relatively low frequency range (e.g., 7-8 gigahertz). The signal generator may then pass this radar signal to frequency multipliers coupled to each transmitter and receiver. These frequency multipliers may increase the frequency of the radar signal to an appropriate and/or desired frequency range (e.g., 120-130 gigahertz).

Implementing frequency multipliers within a radar system may provide various benefits and advantages. For example, the frequency multipliers may synchronously pass the radar signal to each transmitter and receiver of the radar system, thereby ensuring that the radar signals received by each component are in-phase relative to each other. Thus, the frequency multipliers may reduce phase interference between the signals. In addition, because low-frequency signals may attenuate at a slower rate than high-frequency signals during transmission, decreasing the length by which a high frequency radar signal travels may prevent degradation of the radar signal (and allow a lower initial power level of the radar signal). Moreover, coupling a frequency multiplier to a transmitter may enable the frequency-modulated radar signal to be delayed by a certain period of time (e.g., relative to the reference signal passed to the receivers) before transmission. For example, the low-frequency radar signal may be passed through a delay mechanism (e.g., a waveguide or cable) before being converted to a higher frequency. The low-frequency radar signal may experience a significantly lower degree of attenuation than a high-frequency radar signal while passing through such a delay mechanism. In some embodiments, delaying transmission of the frequency-modulated radar signal (while using an undelayed reference signal) may increase a beat frequency calculated in response to a signal returned from a transponder by a predetermined amount, thereby enabling faster and more accurate ranging of the transponder.

The following will provide, with reference to FIGS. 1, 3-5, and 7, detailed descriptions of exemplary systems and apparatuses that may facilitate radar-based artificial reality tracking. Detailed descriptions of exemplary frequency ramps will be provided in connection with FIG. 2. Detailed descriptions of exemplary artificial reality devices and artificial reality environments that may be used in connection with the disclosed embodiments will be provided in connection with FIGS. 6 and 8-10. Detailed descriptions of corresponding computer-implemented methods will be provided in connection with FIG. 11. Finally, detailed descriptions of exemplary augmented or virtual reality devices that may be used with embodiments of this disclosure will be provided in connection with FIGS. 12-17.

FIG. 1 is an illustration of an exemplary apparatus 100 for radar-based artificial reality tracking. In some examples, apparatus 100 may include and/or represent an integrated circuit, a printed circuit board (PCB), a chip, or similar device. Apparatus 100 may be part of and/or included within a radar system and/or an artificial reality system. For example, one or more instances of apparatus 100 may be secured to a wearable artificial reality device worn by a user to facilitate tracking the physical location of all or a portion of the user via FMCW radar.

Apparatus 100 may include one or more transmitters, such as transmitters 145(A)-(D). In some embodiments, the term "transmitter" may refer to any type or form of antenna that emits, distributes, or otherwise transmits a signal. In one example, one or more of transmitters 145(A)-(D) may transmit a frequency-modulated radar signal to facilitate ranging a set of transponders secured to a wearable artificial reality device. The frequency-modulated radar signals transmitted by transmitters 145(A)-(D) may be at least partially generated by a signal generator 105. Signal generator 105 generally represents any type or form of waveform generator, function generator, clock, oscillator, or similar device capable of outputting a frequency-modulated signal. In one embodiment, signal generator 105 may include and/or represent a voltage-controlled oscillator (VCO).

Signal generator 105 may generate a variety of types of frequency-modulated radar signals. In some examples, signal generator 105 may generate a signal whose frequency follows and/or is defined by a frequency ramp. In one embodiment, a frequency ramp may represent and/or correspond to a linear (or approximately linear) sweep from one frequency to a second frequency over a fixed period of time. As an example, a frequency ramp implemented by a radar system may sweep from 119 gigahertz to 127 gigahertz over a period of 0.8 milliseconds. This frequency ramp may then repeat (e.g., continuously or for a certain number of cycles) after reaching 127 gigahertz.

In some embodiments, signal generator 105 may generate a radar signal whose frequency is lower (e.g., by a factor of 10, a factor of 15, etc.) than the frequency of the radar signal that is ultimately transmitted by transmitters 145(A)-(D). In these embodiments, apparatus 100 may include one or more components (such as a frequency multiplier 110) that increase the frequency of the signal generated by signal generator 105 to the desired frequency before the signal is transmitted. Frequency multiplier 110 generally represents any type or form of device and/or circuit whose output frequency is a harmonic (e.g., a multiple) of its input frequency. Frequency multiplier 110 may multiply the frequency of received signals by any suitable and/or selected factor, including a factor smaller than 1 (e.g., frequency multiplier 110 may decrease the frequency of received signals).

In one embodiment, signal generator 105 may pass a frequency-modulated radar signal directly to frequency multiplier 110 (e.g., via a transmission path 115). In this embodiment, transmission path 115 may carry the radar signal to frequency multiplier 110 immediately (e.g., with no or minimal delay). In other embodiments, signal generator 105 may pass the radar signal to one or more intermediate components of a radar system (e.g., components external to apparatus 100) before frequency multiplier 110 receives the radar signal. For example, signal generator 105 may pass the radar signal to another component (such as a delay mechanism) via a transmission path 120(A). The other component may pass the radar signal to frequency multiplier 110 via a transmission path 125. In one example, apparatus 100 may include one of transmission paths 115 and 125. In other examples, apparatus 100 may include both transmission paths 115 and 125, as well as a switch that may be set to connect either transmission path 115 or transmission path 125 to frequency multiplier 110.

Figure 2:
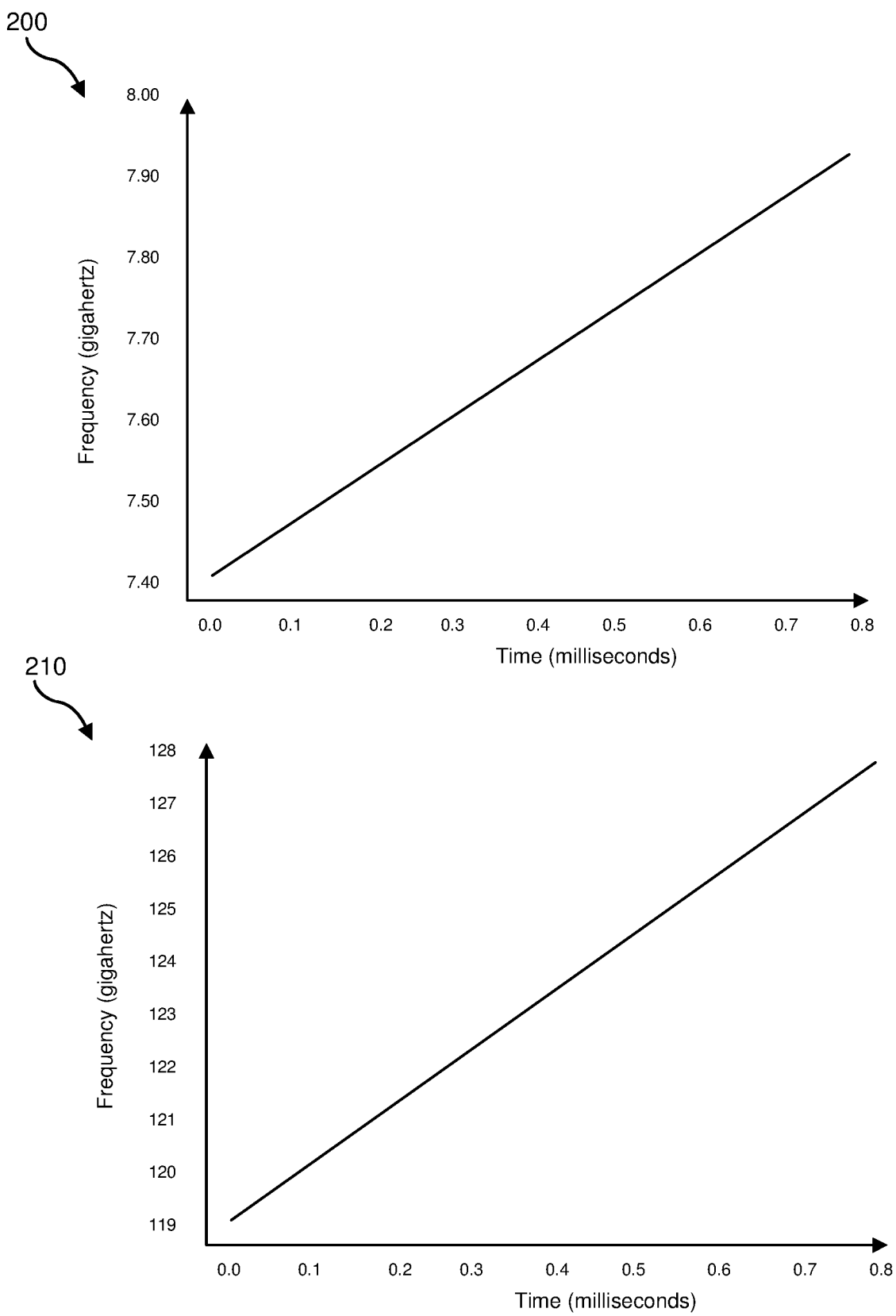
FIG. 2 is an illustration of exemplary frequency ramps.

Once the radar signal is received at frequency multiplier 110 (e.g., either via transmission path 115 or transmission path 125), frequency multiplier 110 may multiply the radar signal by a certain factor. FIG. 2 illustrates an exemplary frequency-modulated radar signal before and after the radar signal is processed by frequency multiplier 110. In this example, a plot 200 illustrates a frequency ramp generated by signal generator 105. As shown in FIG. 2, the frequency of this ramp may increase linearly from 7.44 gigahertz to 7.94 gigahertz over a time period of 0.8 milliseconds. A plot 210 of FIG. 2 illustrates the frequency of the ramp after it is passed through frequency multiplier 110. In one example, frequency multiplier 110 may multiply the frequency of received signals by a factor of 16. Accordingly, plot 210 illustrates a ramp whose frequency increases from 119 gigahertz to 127 gigahertz over 0.8 milliseconds.

In some embodiments, frequency multiplier 110 may pass the radar signal (with the increased frequency) directly to one or more of transmitters 145(A)-(D) to be transmitted. Alternatively, frequency multiplier 110 may pass the radar signal to one or more additional components of apparatus 100. For example, frequency multiplier 110 may pass the radar signal to a buffer 130. As shown in FIG. 1, buffer 130 may pass the radar signal to one or more phase shifters, such as phase shifters 135(A)-(D). In some embodiments, each of phase shifters 135(A)-(D) may shift the phase of the radar signal by a different amount and/or pass signals with a certain phase (e.g., to facilitate tracking eye movement of a user wearing a head-mounted display equipped with apparatus 100 and therefore steer the direction of the transmitted radar signal). In these embodiments, transmitters 145(A)-(D) may represent a four-channel phased array transmitter. As shown in FIG. 1, apparatus 100 may also include one or more power amplifiers (such as power amplifiers 140(A)-(D)) that increase the power of a frequency-modulated radar signal before the frequency-modulated radar signal is transmitted.

In some embodiments, signal generator 105 may pass the frequency-modulated radar signal (e.g., before the frequency of the radar signal is multiplied) to one or more additional components external to apparatus 100. For example, signal generator 105 may pass the radar signal to one or more receivers via transmission paths 120(B)-(D). In this way, and as will be explained in greater detail below, signal generator 105 may synchronize the radar signal received by each transmitter and receiver within a radar system.

Apparatus 100 may include any additional or alternative component not illustrated in FIG. 1, such as one or more controllers, processing devices, portions of memory, resistors, inductors, capacitors, amplifiers, buffers, filters, and the like. Moreover, apparatus 100 may include any suitable number of transmitters (including a single transmitter). In addition, while FIG. 1 illustrates signal generator 105 as part of apparatus 100, signal generator 105 may be external to apparatus 100.

Figure 3:
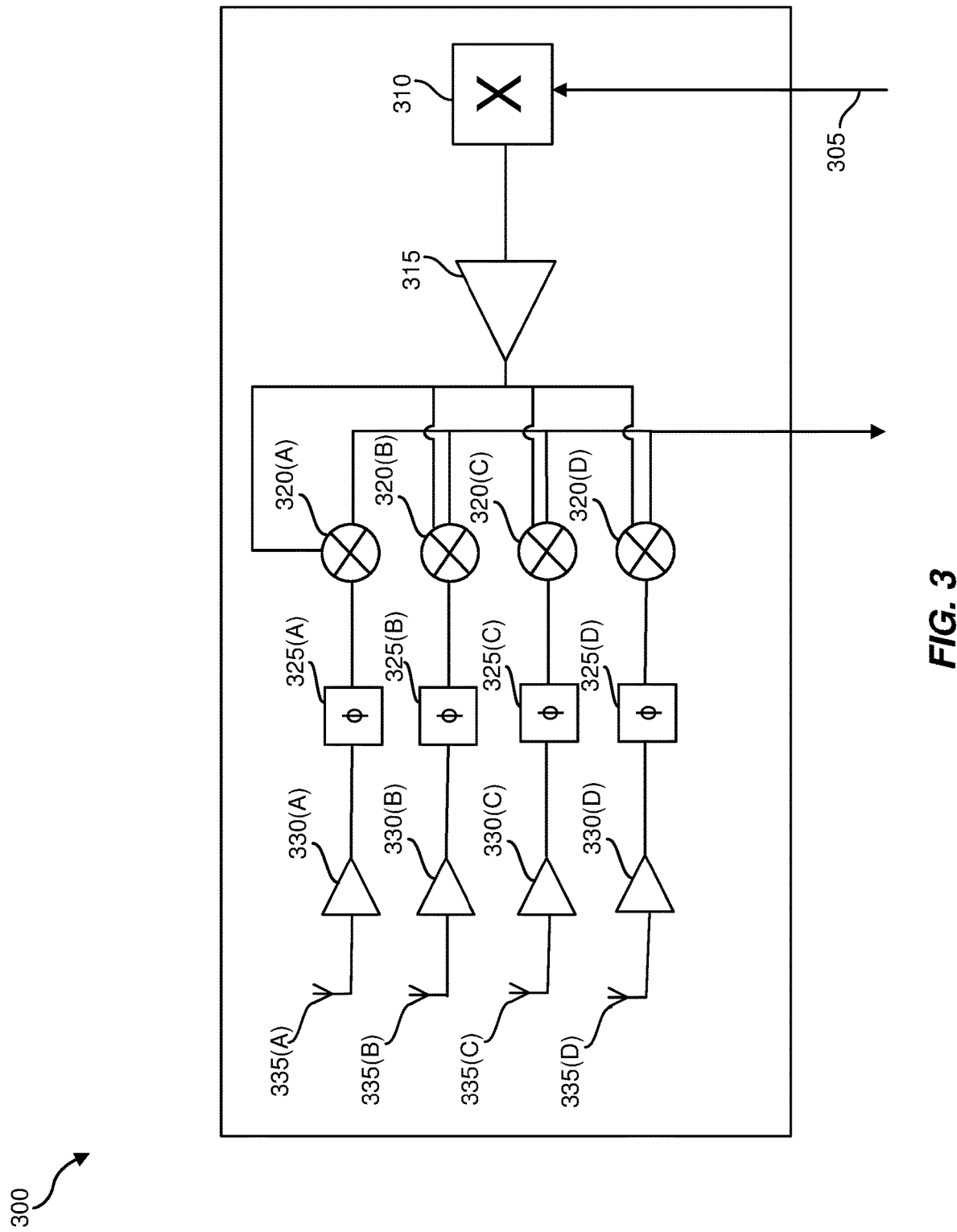
FIG. 3 is an illustration of an exemplary apparatus that may be used in connection with embodiments of this disclosure.

FIG. 3 is an illustration of an exemplary apparatus 300 for radar-based artificial reality tracking. In some embodiments, apparatus 300 may include and/or represent an integrated circuit, a PCB, a chip, or similar device that is part of and/or included within a radar system and/or an artificial reality system. In some examples, apparatus 300 may include one or more receivers, such as receivers 345(A)-(D). In some embodiments, the term "receiver" may refer to any type or form of antenna that receives a signal. In one example, a receiver may receive a signal returned from a target in response to a frequency-modulated radar signal. For example, one or more of receivers 345(A)-(D) may receive signals returned by a set of transponders secured to a wearable artificial reality device.

After receiving a signal, receivers 335(A)-(D) may pass the signal to one or more additional components of apparatus 300. For example, each of receivers 335(A)-(D) may pass the signal to one of amplifiers 330(A)-(D). Amplifiers 330(A)-(D) may represent and/or include low noise amplifiers or any other suitable type of amplifier. After amplifying a received signal, each of amplifiers 330(A)-(D) may pass the signal to one of phase shifters 325(A)-(D). Additionally or alternatively, amplifiers 330(A)-(D) may pass the signal to one of mixers 320(A)-(D). In some embodiments, mixers 320(A)-(D) may mix (e.g., multiply) the signal with a reference signal to facilitate determining the range of the transponder that returned the signal. In one example, apparatus 300 may include one or more components that extract a beat frequency from the mixed signals generated by mixers 320(A)-(D).

In some embodiments, the reference signal utilized by mixers 320(A)-(D) may be transmitted to apparatus 300 via a transmission path 305. In one example, transmission path 305 may correspond to one of transmission paths 120(B)-(D) in FIG. 1. Thus, the reference signal may correspond to the signal generated by signal generator 105 of apparatus 100. In the event that apparatus 100 multiplied the signal generated by signal generator 105 by a certain factor, apparatus 300 may multiply the signal by the same factor. For example, apparatus 300 may pass the signal through a frequency multiplier 310. Frequency multiplier 310 may be generally similar to or the same as frequency multiplier 110 of apparatus 100. In some embodiments, frequency multiplier 310 may pass the signal (with the multiplied frequency) to a buffer 315 before passing the signal to mixers 320(A)-(D). In these embodiments, the combined output of mixers 320(A)-(D) may represent and/or correspond to the output of apparatus 300 (e.g., a beat signal or beat frequency calculated by apparatus 300).

Figure 4:
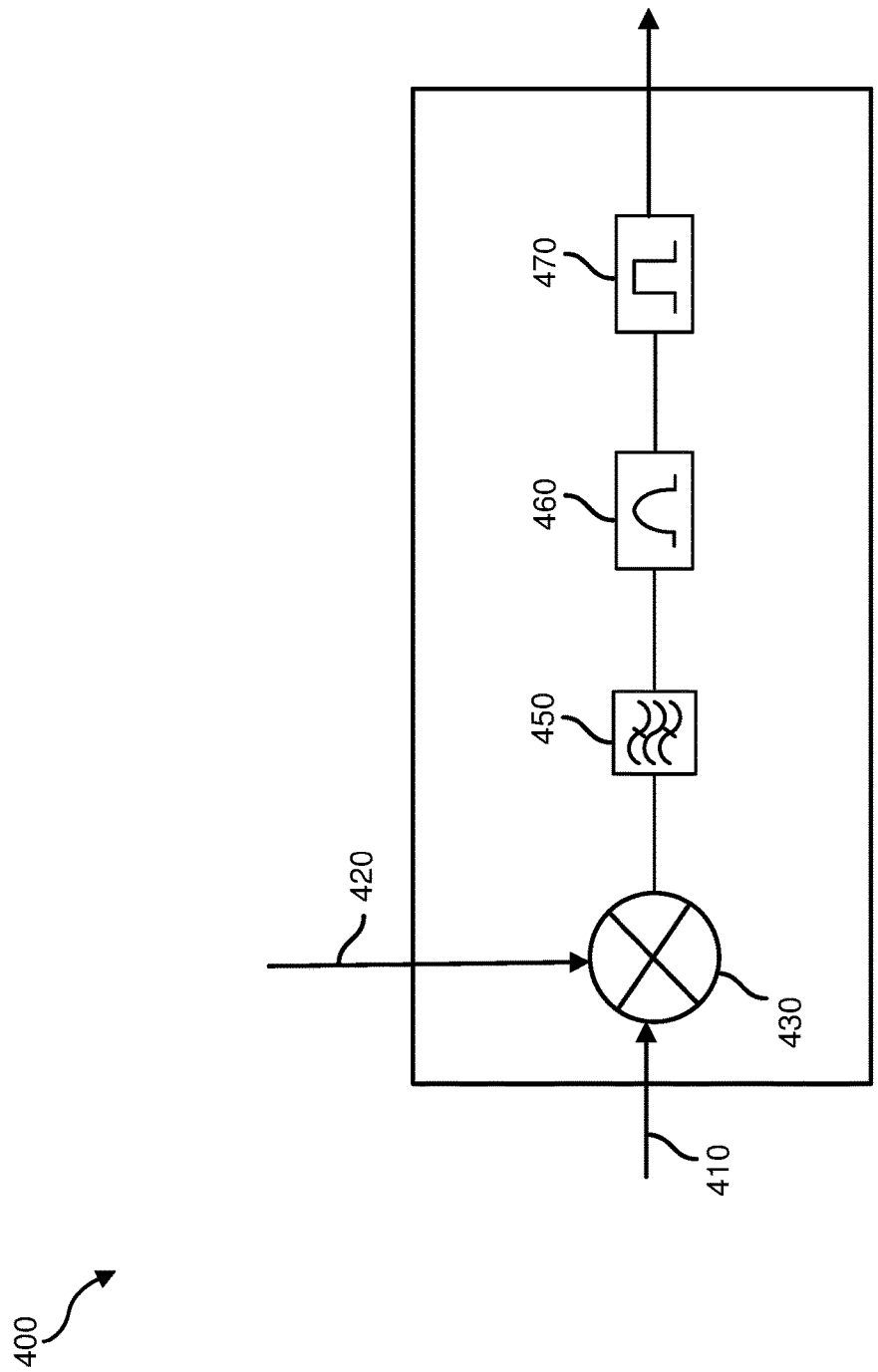
FIG. 4 is an illustration of an exemplary apparatus that may be used in connection with embodiments of this disclosure.

FIG. 4 is an illustration of an exemplary apparatus 400 for radar-based artificial reality tracking. In some embodiments, apparatus 400 may facilitate determining the range of a target (e.g., a transponder). In one embodiment, apparatus 400 may be part of and/or included within apparatus 300. For example, a mixer 430 of apparatus 400 may correspond to one of mixers 320(A)-(D) in FIG. 3. Additionally or alternatively, apparatus 400 may be coupled to and/or in communication with apparatus 300.

In some embodiments, apparatus 400 may receive a reference signal 410. In some embodiments, reference signal 410 may correspond to the signal output by frequency multiplier 310 of apparatus 300. In one example, apparatus 400 may pass reference signal 410 to a mixer 430. In some embodiments, apparatus 400 may also receive a returned signal 420. Returned signal 420 may correspond to a frequency-modulated radar signal returned to apparatus 400 by a transponder. As shown in FIG. 4, apparatus 400 may pass returned signal 420 to mixer 430. Mixer 430 may then combine (e.g., multiply) reference signal 410 and returned signal 420. The signal produced by mixing a returned signal and a reference signal may be referred to as a beat signal. In some examples, this beat signal may contain one or more frequency components and/or harmonics. Specifically, the frequency of the beat signal may include and/or be represented by $f_c \mp f_b$, where $f_c$ corresponds to the carrier frequency of the frequency-modulated radar signal returned by the transponder and $f_b$ corresponds to the beat frequency. In one embodiment, the carrier frequency may correspond to an intentional frequency shift introduced into the returned signal by the transponder (e.g., to facilitate identifying the transponder within a group of transponders and/or reduce noise within the returned signal).

In some examples, mixer 430 may pass the output of mixer 430 to a filter 450. Filter 450 may represent any type of filter designed to remove frequency-modulation (e.g., frequency-modulation surrounding the beat frequency and/or frequency-modulation corresponding to the frequency-modulated radar signal) from a signal. For example, filter 450 may represent a bandpass filter whose center frequency corresponds to the carrier frequency utilized by a transponder. Filter 450 may filter and then optionally rectify the signal received from mixer 430. In some examples, rectifying the signal may double the frequency of the signal. Filter 450 may then pass the filtered signal to an envelope detector 460 that generates an envelope of the filtered signal. The frequency of this envelope signal may correspond to the beat frequency (or twice the beat frequency). Accordingly, envelope detector 460 may pass the envelope signal to a pulse detector 470 that determines (via, e.g., a comparator or similar device) the frequency of the envelope signal. In the event that filter 450 rectified the signal, pulse detector 470 may take into account that the detected frequency may be twice the beat frequency.

Apparatus 400 may include any additional or alternative element not illustrated in FIG. 4. For example, apparatus 400 may include an oscillator and an additional mixer that passes signals with a certain carrier frequency. In this way, the oscillator may act as a filter for signals returned by a certain transponder (e.g., the oscillator may not pass signals returned by transponders that utilize different carrier frequencies). Alternatively, apparatus 400 may separate signals returned from a particular transponder via a bandpass filter whose center frequency corresponds to the carrier frequency utilized by the transponder. In further examples, apparatus 400 may include both a mixer that shifts the frequency of a received signal to a certain frequency (e.g., an intermediate frequency) and a bandpass filter centered around the certain frequency. Such a configuration may be advantageous in applications where a bandpass filter with a high center frequency is unavailable and/or impractical. Moreover, in addition to or instead of envelope detector 460, apparatus 400 may include a square law detector. Apparatus 400 may include any additional type or form of component, including a high pass filter and/or a rectifier.

After determining the beat frequency, apparatus 400 (or a processing device coupled to apparatus 400) may calculate and/or accurately estimate the range of the transponder based on the beat frequency. For example, the processing device may implement the following formula:

$$\text{distance} = \frac{\text{speed of light} \times \text{beat frequency}}{2 \times \text{rate of radar frequency sweep}}.$$

Other embodiments of such a formula may account for certain real-world offsets, compensations, and/or processing delays that potentially affect the travel time of the transmission and/or returned signals. In some embodiments, the processing device may store information about the range and/or location of the transponder. Additionally or alternatively, the processing device may pass this information to an artificial reality system that provides virtual content (such as images and/or haptic feedback) to the user. The artificial reality system may use this information to generate and/or improve the virtual content. For example, the artificial reality system may adjust the location at which the user perceives a portion of virtual content to account for an updated and/or current location of the user. In another example, the artificial reality system may adjust the location and/or appearance of a virtual representation of the user that is provided to an additional user remotely.

Figure 5:
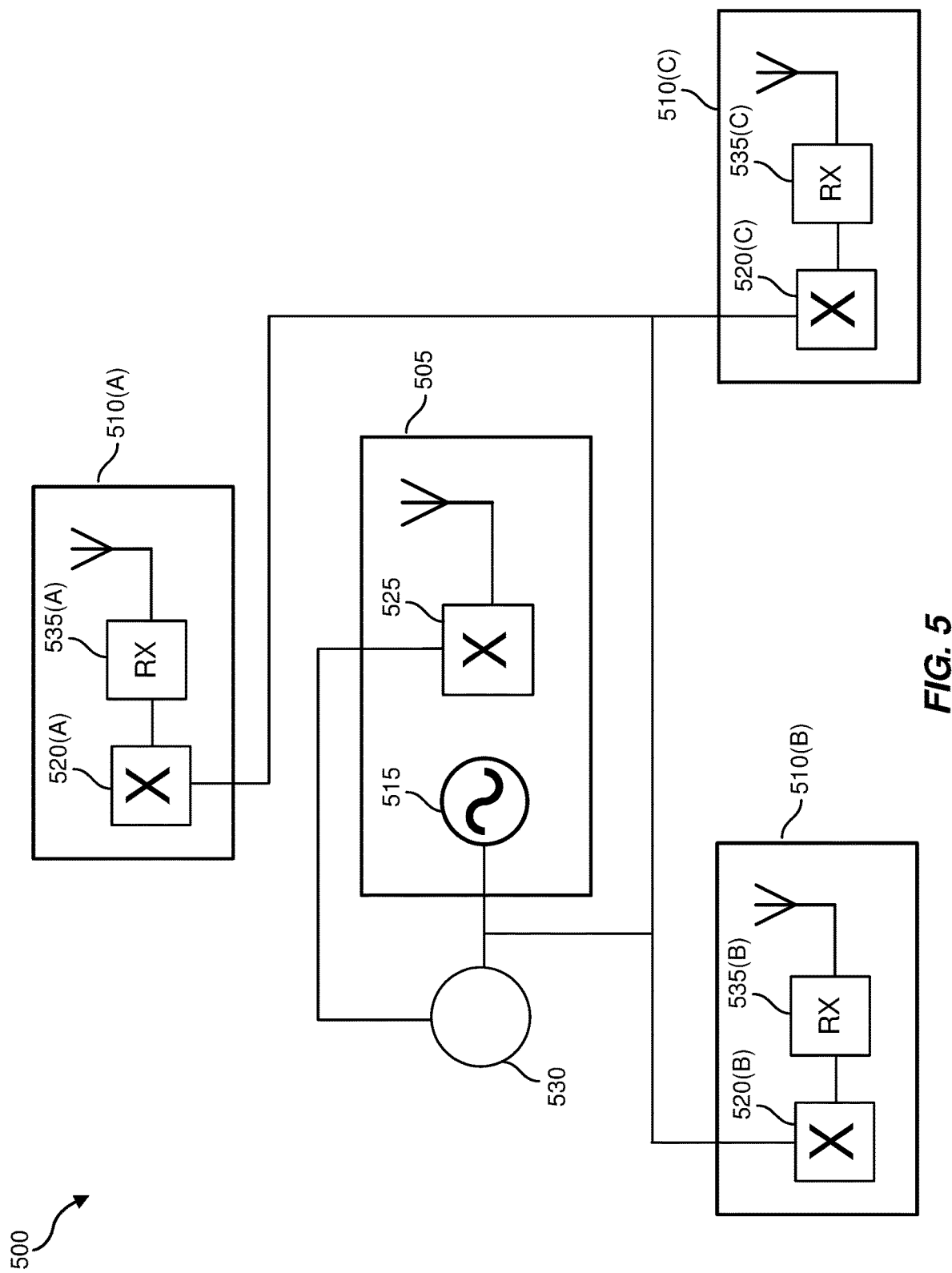
FIG. 5 is an illustration of an exemplary system that may be used in connection with embodiments of this disclosure.

FIG. 5 is an illustration of an exemplary system 500 for radar-based artificial reality tracking. In this example, system 500 may include at least one transmitter. For example, apparatus 505 of system 500 may correspond to and/or include an instance of apparatus 100 in FIG. 1. In addition, system 500 may include multiple receivers. For example, each of apparatuses 510(A)-(C) may correspond to and/or include an instance of apparatus 300 in FIG. 3. In some embodiments, the receivers within apparatuses 510(A)-(C) may facilitate three-dimensional localization of a transponder. For example, each of apparatuses 510(A)-(C) may be secured at least a certain distance (e.g., several centimeters, several inches, etc.) apart from each other and/or apparatus 505 to facilitate such localization. The apparatuses may be secured on a wearable device (such as an artificial reality headset), within the physical environment surrounding a user of an artificial reality system, and/or in any other suitable manner.

As shown in FIG. 5, apparatus 505 may include a signal generator 515. In some examples, signal generator 515 may generate a frequency-modulated radar signal and then pass the frequency-modulated radar signal to frequency multipliers 520(A)-(C) within apparatuses 510(A)-(C). The frequency-modulated radar signal received by each of apparatuses 510(A)-(C) may be utilized (e.g., by receiving devices 535(A)-(C) within apparatuses 510(A)-(C)) as a reference signal to facilitate ranging a transponder based on signals received at each apparatus.

In some embodiments, signal generator 515 may synchronously pass the same frequency-modulated radar signal to each of frequency multipliers 520(A)-(C). In one example, the instantaneous frequency of a frequency-modulated radar signal received synchronously by two or more components may be the same (or approximately the same). In addition, the instantaneous phase of the synchronous frequency-modulated radar signals may be the same (or approximately the same). For example, the signals may be in-phase with each other. In some embodiments, synchronously passing the frequency-modulated radar signal to each of apparatuses 510(A)-(C) may ensure that the beat frequencies determined by the apparatuses are not offset relative to each other, as well as reduce and/or minimize phase interference between the apparatuses.

In some embodiments, the disclosed systems may help ensure that the frequency-modulated radar signals are synchronously passed to each of apparatuses 510(A)-(C) by standardizing the length of transmission paths between signal generator 515 and each of apparatuses 510(A)-(C). For example, each transmission path may be the same length (or approximately the same length). In this way, the frequency-modulated radar signal generated by signal generator 515 may travel the same distance and/or for the same amount of time when traversing to each frequency multiplier. In addition, in the event that each of frequency multipliers 520(A)-(C) are the same or similar, the frequency-modulated radar signals output by each frequency multiplier may also be in sync (e.g., identical or approximately identical).

As shown in FIG. 5, signal generator 515 may also pass the frequency-modulated radar signal to a frequency multiplier 525 of apparatus 505 to be transmitted by the transmitter of apparatus 505. In one example, signal generator 515 may directly pass the frequency-modulated radar signal to frequency multiplier 525. In this example, the frequency-modulated radar signal may be multiplied and transmitted immediately (e.g., with minimal delay) after being generated. As such, the instantaneous frequency of the frequency-modulated radar signal transmitted by apparatus 505 may be the same as or similar to the instantaneous frequency of the reference signals received at apparatuses 510(A)-(C).

In other embodiments, the frequency-modulated radar signal may be delayed by a certain amount (e.g., 1 millisecond, 3 milliseconds, etc.) before being transmitted by apparatus 505. For example, system 500 may include a delay mechanism 530 that introduces a delay into the frequency-modulated radar signal before the frequency-modulated radar signal is passed to frequency multiplier 525. Delay mechanism 530 generally represents any type or form of device or component that suspends, interrupts, or otherwise delays transmission of a signal for a certain period of time. In some embodiments, the delay introduced by delay mechanism 530 may offset the instantaneous frequency of the frequency-modulated radar signal transmitted by apparatus 505 by a certain amount relative to the instantaneous frequency of the reference signals utilized by apparatuses 510(A)-(C). For example, in the event that the frequency-modulated radar signal is defined by and/or corresponds to a linear frequency sweep, the instantaneous frequency transmitted by apparatus 505 may be lower than the instantaneous frequency of the reference signals. This frequency offset may result in and/or generate an apparent beat frequency that is higher (e.g., by a fixed amount) than a beat frequency corresponding to the actual range of a transponder. In some embodiments, extracting an increased beat frequency (e.g., using a zero-crossing detection process) may be faster and/or more efficient than determining the actual (e.g., lower) beat frequency. Thus, delay mechanism 530 may increase the accuracy (as well as reduce power consumption and operational frequency bandwidth) of system 500. When determining the range of a transponder, system 500 may account for the fixed increase in the beat frequency.

In one embodiment, delay mechanism 530 may include and/or represent a waveguide and/or cable (e.g., a fiber optic cable). In this embodiment, the length of the cable may be selected and/or determined such that the frequency-modulated radar signal traverses along the cable for the desired period of delay. For example, an appropriate length may be calculated based on the speed of light within the cable (e.g., 200,000 kilometers per second). In other embodiments, delay mechanism 530 may represent and/or include a coaxial cable, a delay line, a PCB trace, and/or any other suitable mechanism. Additionally or alternatively, delay mechanism 535 may be at least partially implemented via software. Moreover, while FIG. 5 illustrates delay mechanism 530 external to apparatus 505, delay mechanism 530 may be included within apparatus 505 or any additional apparatus of system 500.

In some embodiments, the frequency-modulated radar signal generated by signal generator 515 may degrade and/or attenuate as the signal traverses to various components of system 500. For example, the power level of the frequency-modulated radar signal received by frequency multipliers 525 and 520(A)-(C) may be a certain amount or percentage lower than the power level of the frequency-modulated radar signal output by signal generator 515. Because signal attenuation increases as the length of transmission increases, decreasing the physical distance that the frequency-modulated radar signal travels may reduce and/or minimize attenuation of the signal. However, reducing the distance that the frequency-modulated radar signal travels may not be possible and/or desirable beyond a certain point. For example, the receivers of system 500 may be at least a certain distance (e.g., several centimeters or several inches) apart from each other in order to provide accurate three-dimensional localization of a transponder. In addition, delay mechanism 530 may greatly increase the transmission distance between signal generator 515 and frequency multiplier 525.

In some embodiments, the frequency multipliers of system 500 may help reduce and/or mitigate attenuation of the frequency-modulated radar signal. For example, signals with lower frequencies may experience less attenuation than signals with higher frequencies. As an example, the relatively low-frequency radar signal output by signal generator 515 may have a higher power level after traversing a certain distance than a high-frequency radar signal (e.g., a radar signal with the final and/or desired frequency range) after traversing the same distance. In some embodiments, the frequency multipliers of system 500 may be positioned such that the distances the low-frequency radar signals travel are increased and/or maximized relative to the distances the high-frequency radar signals (e.g., the multiplied radar signals) travel. In this way, the disclosed systems may reduce attenuation of the frequency-modulated radar signal, thereby reducing the required initial power level of the frequency-modulated radar signal. Moreover, implementing the frequency multipliers may enable and/or optimize operation of delay mechanism 530.

Figure 6:
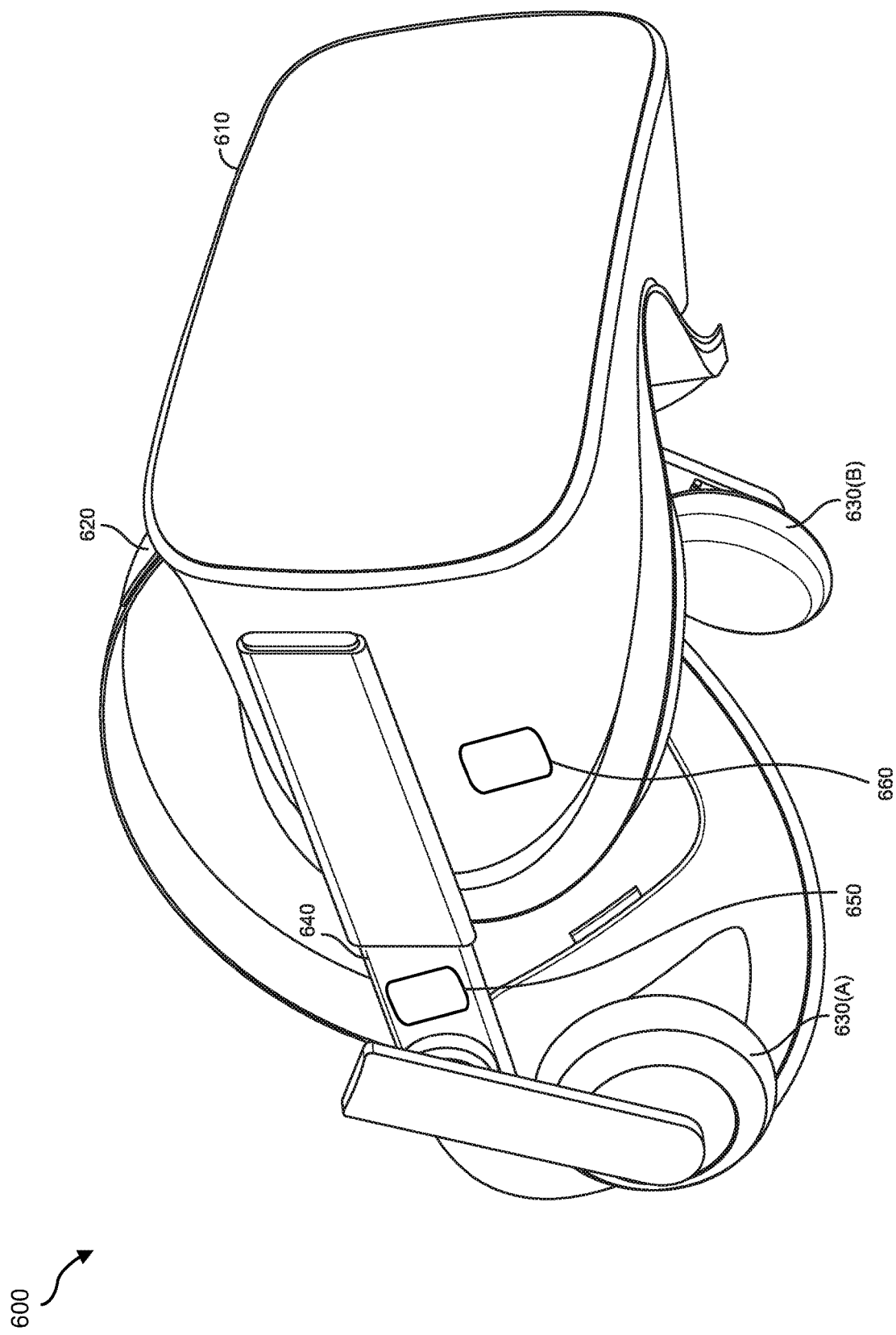
FIG. 6 is an illustration of an exemplary wearable device that may be used in connection with embodiments of this disclosure.

FIG. 6 illustrates an exemplary wearable device 600 for radar-based artificial reality tracking. In some embodiments, the term "wearable device" may refer to any type or form of computing device that is worn by a user of an artificial reality system as part of an article of clothing, an accessory, and/or an implant. Examples of wearable device include, without limitation, headsets, headbands, head-mounted displays, wristbands, gloves, glasses, and/or ankle bands. In one embodiment, wearable device 600 may correspond to and/or represent a head-mounted display that is designed to be worn on a user's face. As shown in FIG. 6, wearable device 600 may include a front rigid body 610 and a band 620 shaped to fit around the user's head. Wearable device 600 may also include output audio transducers 630(A) and 630(B). In addition, wearable device 600 may include a connector 640 that connects front rigid body 610 to band 620 and/or audio transducers 630(A).

As shown in FIG. 6, wearable device 600 may include one or more radar devices, such as a radar device 650 and a radar device 660. In one embodiment, radar devices 650 and 660 may correspond to apparatuses 510(A) and 510(B) in FIG. 5, respectively. Although not illustrated in FIG. 6, wearable device 600 may also include one or more instances of apparatuses 505 and 510(C). These apparatuses may be secured to wearable device 600 in any suitable location, configuration, or pattern. For example, apparatus 505 may be secured in a central location of wearable device 600, such as the top of front rigid body 610 or band 620. In this example, apparatuses 510(A)-(C) may surround apparatus 505 (e.g., apparatuses 510(A)-(C) may form a triangle around apparatus 505). In some embodiments, wearable device 600 may also include one or more delay mechanisms (such as delay mechanism 530). In addition, wearable device 600 may include a processing device that directs, controls, and/or receives input from one or more radar devices secured to wearable device 600. In some embodiments, this processing device may be part of and/or communicate with an artificial reality system that presents virtual content to the user. Wearable device 600 may also include any number or type of communication interfaces, memory devices, displays, power supplies, and the like.

Figure 7:
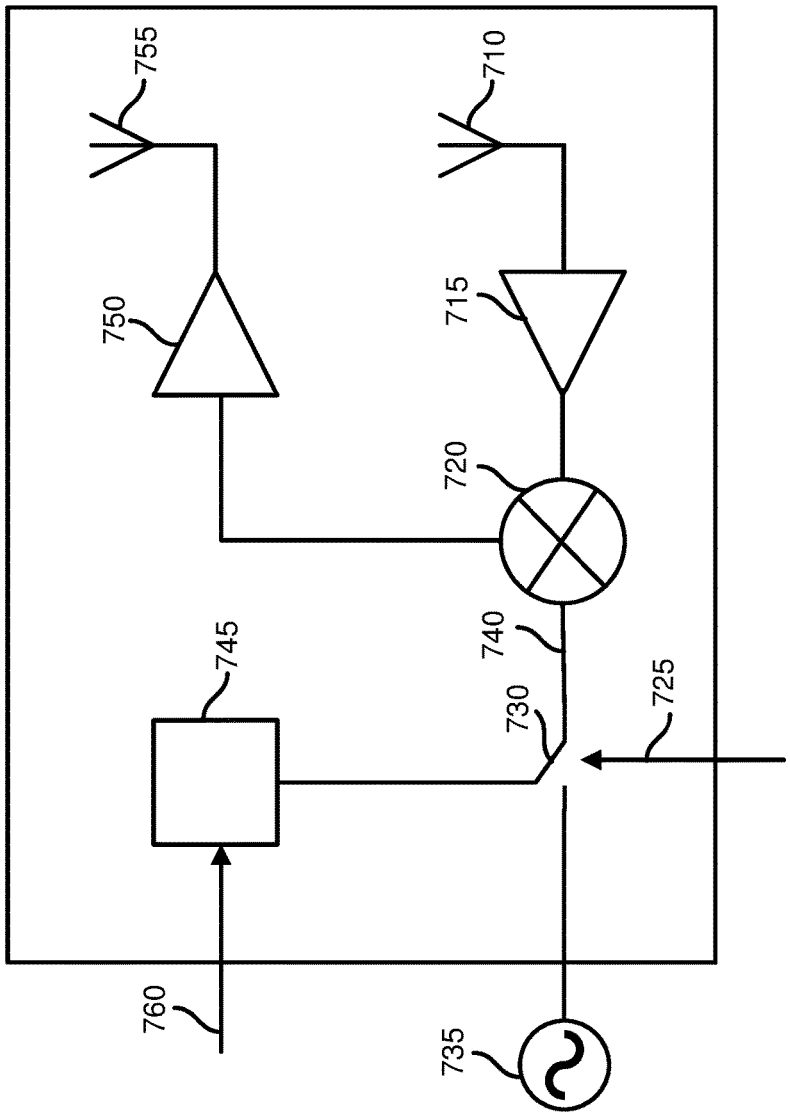
FIG. 7 is an illustration of an exemplary apparatus that may be used in connection with embodiments of this disclosure.

FIG. 7 is an illustration of an exemplary transponder 700. In some examples, transponder 700 may include a receiving antenna 710 that receives frequency-modulated radar signals from transmitters. After receiving antenna 710 receives a signal, receiving antenna 710 may pass the signal to an amplifier 715 that increases the power of all or a portion of the received signal. In one embodiment, amplifier 715 may represent a low-noise amplifier. In some examples, transponder 700 may retransmit the received signal after the received signal has been amplified. For example, amplifier 715 may pass the amplified signal directly to a transmitting antenna 755. In other embodiments, transponder 700 may shift the frequency of the received signal by a certain amount before retransmitting the received signal.

Transponder 700 may shift the frequency of the received signal in a variety of ways. In one embodiment, amplifier 715 may pass the received signal to a mixer 720. In this embodiment, mixer 720 may shift the frequency of the received signal based on a signal 740 that is also passed to mixer 720. For example, mixer 720 may multiply the received signal and signal 740 in order to shift the frequency of the received signal by an amount corresponding to the frequency of signal 740. In one example, signal 740 may be provided by an oscillator 735 that outputs a signal with a certain frequency. Alternatively, signal 740 may be provided by a frequency divider 745 that generates a signal with a certain frequency by dividing a signal 760 that has a different frequency. In one embodiment, signal 760 may be generated and/or transmitted by a remote component of a radar system. For example, signal 760 may be provided by a processing device that directs the operation of transponder 700. As shown in FIG. 7, the input to mixer 720 may be controlled by a control signal 725 that is input to a switch 730.

After mixer 720 shifts the frequency of the received signal, mixer 720 may pass the shifted signal to an amplifier 750. After amplifying the shifted signal by a certain amount, amplifier 750 may pass the shifted signal to transmitting antenna 755. Transmitting antenna 755 may then transmit the shifted signal such that the shifted signal may be received by a receiver.

Transponder 700 may include any additional or alternative components not illustrated in FIG. 7. For example, transponder 700 may include a processing device that directs and/or controls one or more components of transponder 700. Additionally or alternatively, transponder 700 may include any number or type of communication interfaces (such as Serial Peripheral Interfaces (SPIs)), memory devices, power detectors, and/or power supplies. Moreover, transponder 700 may receive and transmit signals whose frequencies correspond to any suitable range and/or value. In one embodiment, transponder 700 may be capable of and/or configured to receive frequency-modulated radar signals whose frequencies sweep between approximately 120 gigahertz and 130 gigahertz. In addition, transponder 700 may be capable of shifting the frequencies of signals by any suitable amount. For example, transponder 700 may shift the frequencies of received signals by 1 megahertz, 2 megahertz, etc.

Figure 8:
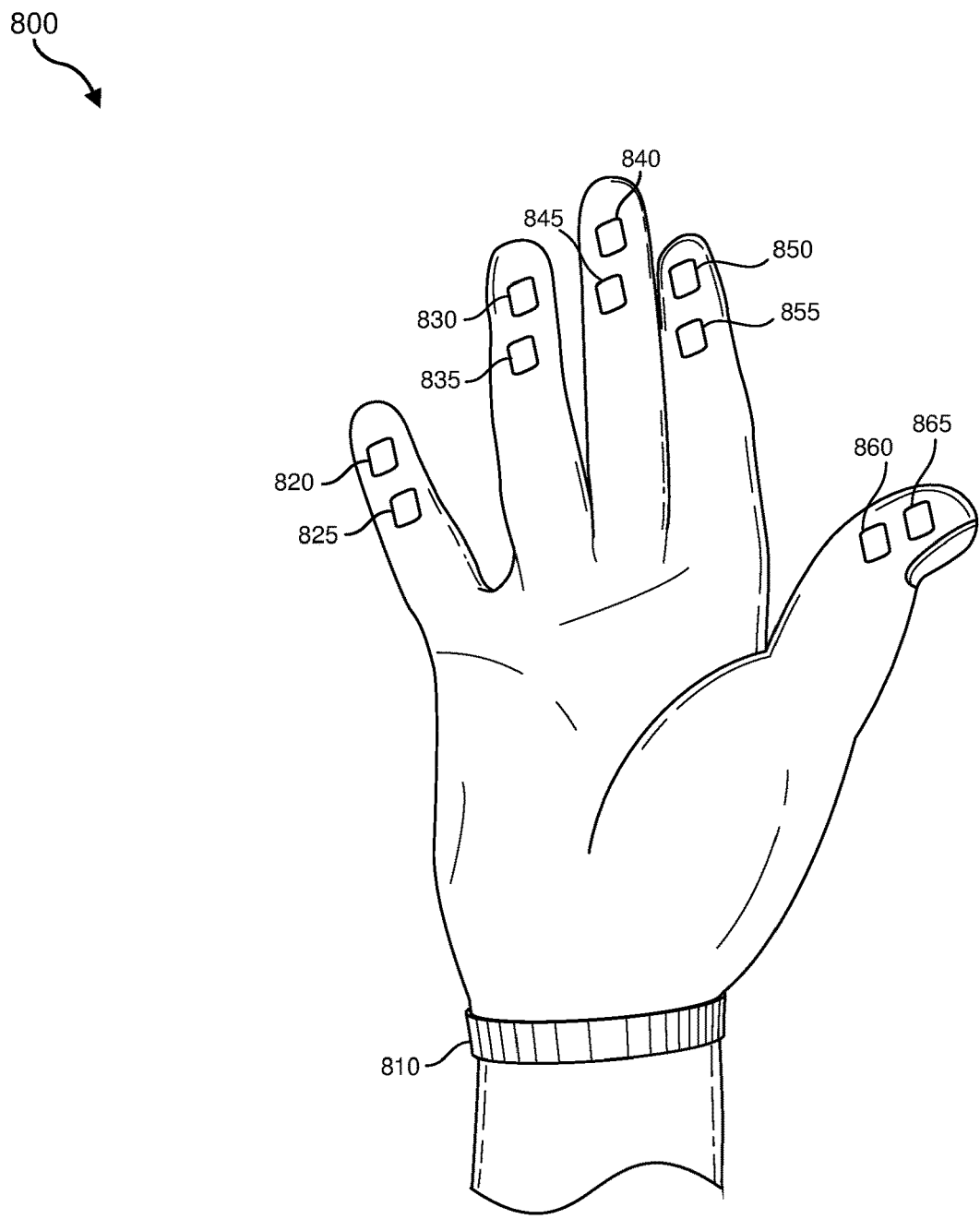
FIG. 8 is an illustration of an exemplary wearable device that may be used in connection with embodiments of this disclosure.

FIG. 8 is an illustration of an exemplary wearable device 800 for radar-based artificial reality tracking. In one example, wearable device 800 may represent and/or include a glove that is designed to be worn on the hand/or wrist of a user. Wearable device 800 may include and/or contain a variety of different materials. Examples of such materials include, without limitation, cottons, polyesters, nylons, elastics, plastics, neoprene, rubbers, metals, combinations or variations of one or more of the same, and/or any other suitable materials. Wearable device 800 may be defined and/or formed in a variety of shapes and/or sizes with the aim of securing to the hand and/or wrist of a user of an artificial reality system. In some examples, one or more components of wearable device 800 (such as a wristband 810) may be adjustable to provide a one-size-fits-most feature.

In some examples, wearable device 800 may include one or more transponders. For example, as shown in FIG. 8, wearable device 800 may include transponders 820, 825, 880, 885, 840, 845, 850, 855, 860, and 865. In one embodiment, all or a portion of these transponders may correspond and/or be generally similar to transponder 700 illustrated in FIG. 7. In addition, these transponders may be fastened, attached, and/or secured to wearable device 800 in any suitable manner and/or configuration.

In one embodiment, the transponders on wearable device 800 may facilitate determining the position of the front of each of the user's fingers. For example, these transponders may be secured in locations that correspond to the user's fingertips when the user is wearing wearable device 800. Wearable device 800 may include any additional or alternative transponders not shown in FIG. 8, such as one or more transponders that facilitate determining the position of the back of the user's fingers and/or the position of the user's palm.

Figure 9:
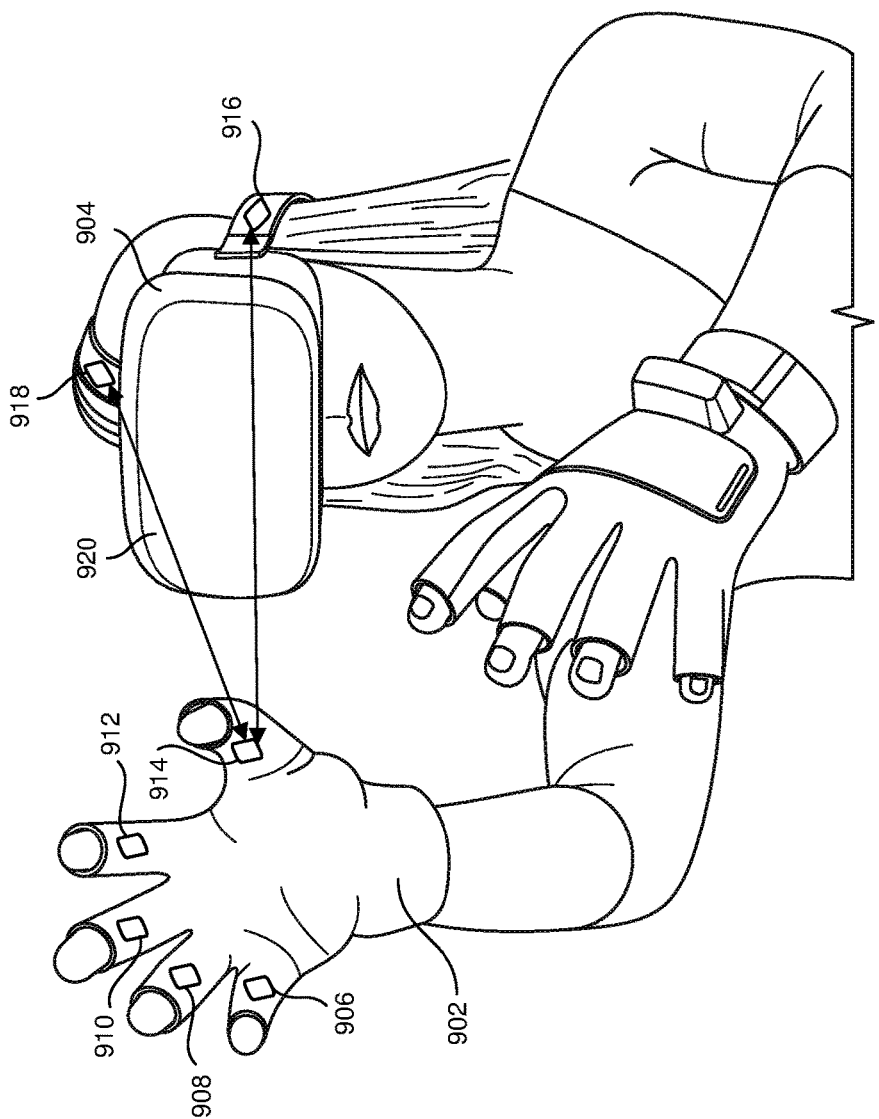
FIG. 9 is an illustration of an exemplary artificial reality environment that may be used in connection with embodiments of this disclosure.

FIG. 9 illustrates an exemplary system 900 for radar-based artificial reality tracking. Specifically, FIG. 9 illustrates a user wearing a glove 902 (which may correspond to an embodiment of wearable device 800 in FIG. 8) and a head-mounted display 904 (which may correspond to an embodiment of wearable device 600 in FIG. 6). In this example, head-mounted display 904 may include one or more radar devices, such as a radar device 916 and a radar device 918 (which may correspond to one or more of apparatuses 505 and 510(A)-(C) in FIG. 5). In some embodiments, the radar devices of glove 902 may determine the range of one or more transponders (e.g., transponders 906, 908, 910, 912, and 914) secured to glove 902. The radar devices may then pass information about the range of the transponders to a processing device and/or artificial reality system that provides virtual content to the user via head-mounted display 904. For example, the processing device and/or artificial reality system may determine a current physical location of the portions of the user corresponding to the transponders of glove 902. The artificial reality system may then provide virtual content to the user based on these locations.

As a specific use-case example, head-mounted display 904 may provide virtual content (e.g., images, videos, and/or graphics) to the user via a display 920. In this example, head-mounted display 904 may project images on display 920 that create the perception of the user holding an object. Based on the current location of the transponders on glove 902, head-mounted display 904 may select and/or adjust the location of the projected images on display 920 to provide a believable and immersive virtual experience for the user. In some embodiments, head-mounted display 920 may periodically update the location and/or appearance of the projected images to account for movement of the user's hand and/or head.

Figure 10:
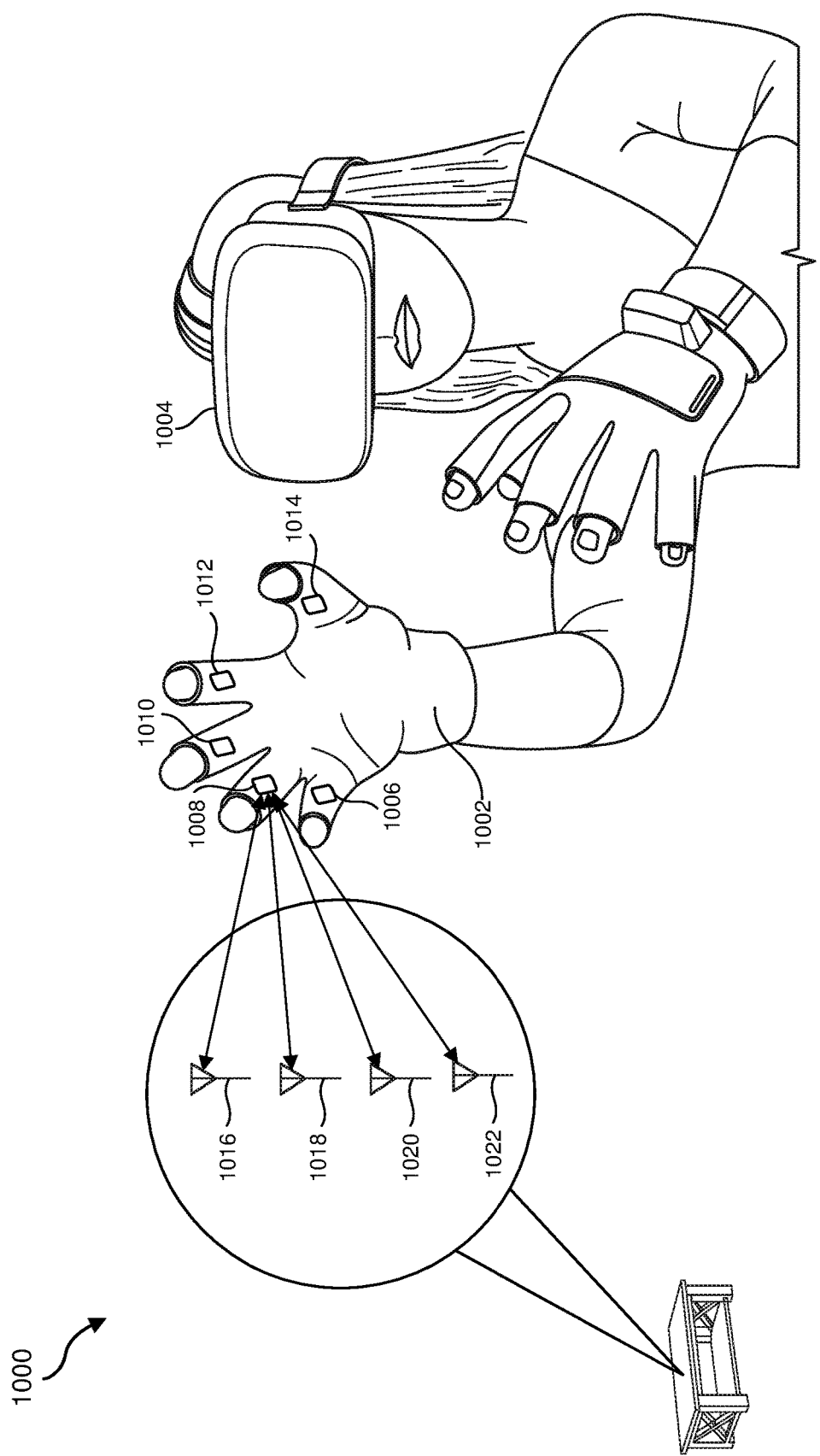
FIG. 10 is an illustration of an exemplary artificial reality environment that may be used in connection with embodiments of this disclosure.

FIG. 10 illustrates an exemplary system 1000 that facilitates radar-based artificial reality tracking. Specifically, FIG. 10 illustrates a user wearing a glove 1002 (which may correspond to an embodiment of wearable device 800 in FIG. 8) and a head-mounted display 1004 (which may correspond to an embodiment of wearable device 600 in FIG. 6). FIG. 10 also illustrates an array of radar devices that may include radar devices 1016, 1018, 1022, and 1022 (which may correspond to apparatuses 505 and 510(A)-(C) in FIG. 5). These radar devices may be located within the physical environment surrounding the user (rather than on a wearable device worn by the user). For example, as illustrated in FIG. 10, the radar devices may be located on a nearby table. In contrast to the radar devices of system 900, the radar devices of system 1000 may be stationary (e.g., in a fixed location).

In some embodiments, radar devices 1016, 1018, 1020, and/or 1022 may periodically determine the range of all or a portion of the transponders of glove 1002 (e.g., transponders 1006, 1008, 1010, 1012, and/or 1014). The radar devices may then pass information about the range of the transponders to a processing device and/or artificial reality system. In one embodiment, this artificial reality system may provide virtual content to the user via head-mounted display 1004 (as discussed in connection with FIG. 9). Additionally or alternatively, the artificial reality system may provide virtual content to an additional (e.g., remote) user.

As a specific use-case example, the user wearing glove 1002 may interact remotely (via, e.g., a computing device and/or a network) with an additional user. In this example, the artificial reality system may provide a virtual representation of all or a portion of the user wearing glove 1002 to the additional user. For example, based on the current location of the transponders on glove 1002, the artificial reality system may insert an image of all or a portion of the user's hand into a virtual three-dimensional environment displayed to the additional user. Additionally, the artificial reality system may periodically update the location and/or appearance of the image to account for movement of the user's hand. These features of the disclosed radar systems may be useful and/or advantageous in a variety of applications, including gaming applications and remote-conferencing applications.

Figure 11:
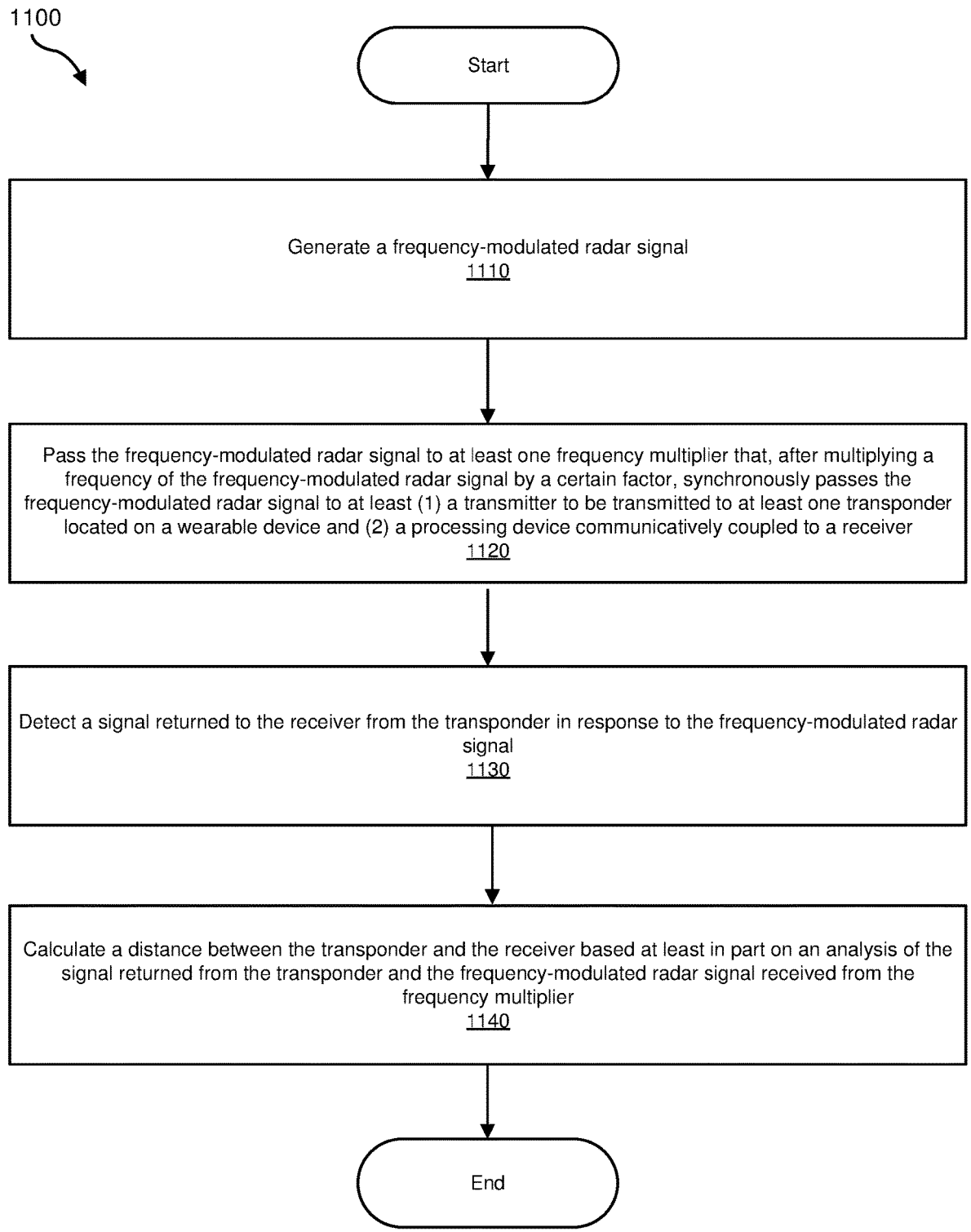
FIG. 11 is a flowchart of an exemplary method for radar-based artificial reality tracking.

FIG. 11 is a flow diagram of an exemplary method 1100 for radar-based artificial reality tracking according to any of the embodiments disclosed herein. The steps shown in FIG. 11 may incorporate and/or involve various sub-steps and/or variations consistent with the descriptions described above in connection with FIGS. 1-10.

As illustrated in FIG. 11, at step 1110 a radar system may generate a frequency-modulated radar signal. In one embodiment, the frequency-modulated radar signal may be defined by and/or correspond to a linear frequency sweep. In addition, the frequency range of the frequency-modulated radar signal may be lower than the frequency range of frequency-modulated radar signals that are ultimately transmitted by the radar system. For example, the frequency-modulated radar signal may sweep between approximately 7 gigahertz and 8 gigahertz.

At step 1120 in FIG. 11, the radar system may pass the frequency-modulated radar signal to at least one frequency multiplier that, after multiplying a frequency of the frequency-modulated radar signal by a certain factor, synchronously passes the frequency-modulated radar signal to at least (1) a transmitter to be transmitted to at least one transponder located on a wearable device and (2) a processing device communicatively coupled to a receiver. In some embodiments, the radar system may pass the frequency-modulated radar signal through a delay mechanism that delays the frequency-modulated radar signal by a certain period of time (e.g., 1 millisecond, 3 milliseconds, etc.) before passing the frequency-modulated radar signal to the transmitter.

In some examples, the radar system may include a frequency multiplier coupled to the transmitter and an additional frequency multiplier coupled to the processing device. For example, the radar system may include a separate frequency multiplier for each component that receives the frequency-modulated radar signal. Each of these frequency multipliers may multiply the frequency-modulated radar signal by the same amount (e.g., by a factor of 10, a factor of 16, etc.). In one embodiment, the frequency-modulated radar signal may sweep between approximately 120 gigahertz and 130 gigahertz after passing through the frequency multiplier. Because high-frequency signals may attenuate at a faster rate than low-frequency signals during transmission, generating a low-frequency radar signal and then multiplying the frequency of the radar signal before it reaches the transmitters and receivers of the radar system may help maintain the quality and/or power level of the radar signal.

At step 1130 in FIG. 11, the radar system may detect a signal returned to the receiver from the transponder in response to the frequency-modulated radar signal. For example, the processing device coupled to the receiver may periodically or continuously monitor signals received by the receiver.

At step 1140 in FIG. 11, the radar system may calculate a distance between the transponder and the receiver based at least in part on an analysis of the signal returned from the transponder and the frequency-modulated radar signal received from the frequency multiplier. For example, the radar system may combine the returned signal with a reference signal (e.g., the frequency-modulated radar signal that was passed to the processing device coupled to the receiver) and then extract a beat frequency from the combined signal. This beat frequency may be proportional to the distance between the transponder and the radar device.

In some embodiments, the radar system may determine a three-dimensional location of the transponder based on a combined analysis of signals received at each receiver of the radar system. For example, the radar system may determine a current physical location of the portion of the user's body that is coupled to and/or in contact with the transponder. In some embodiments, the radar system may pass information about the current physical location of the portion of the user to an artificial reality system. The artificial reality system may then generate and/or modify one or more virtual components presented to the user based on the current physical location of the portion of the user.

Example Embodiments

Example 1: A radar system that includes a radar mechanism comprising a transmitter and at least one receiver. The radar system may also include a signal generator that generates a frequency-modulated radar signal. In addition, the radar system may include at least one frequency multiplier that, after multiplying a frequency of the frequency-modulated radar signal by a certain factor, synchronously passes the frequency-modulated radar signal to (1) the transmitter to be transmitted to at least one transponder located on a wearable device and (2) a processing device communicatively coupled to the receiver. The processing device may (1) detect a signal returned to the receiver from the transponder in response to the frequency-modulated radar signal and (2) calculate a distance between the transponder and the receiver based at least in part on an analysis of the signal returned from the transponder and the frequency-modulated radar signal received from the frequency multiplier.

Example 2: The radar system of Example 1, further comprising an additional wearable device that secures at least the transmitter, the receiver, the signal generator, and the frequency multiplier.

Example 3: The radar system of Examples 2, wherein the receiver comprises a plurality of receivers that are secured to the additional wearable device such that each of the plurality of receivers are separated by at least a certain distance.

Example 4: The radar system of Example 3, wherein the processing device comprises a plurality of processing devices that are each communicatively coupled to one of the plurality of receivers.

Example 5: The radar system of Example 4, wherein the frequency multiplier comprises a plurality of frequency multipliers that each synchronously pass the frequency-modulated radar signal to one of the plurality of receivers.

Example 6: The radar system of Example 4, wherein (1) the plurality of receivers each receive the signal returned from the transponder in response to the frequency-modulated radar signal and (2) each of the plurality of processing device calculates a distance between the transponder and the receiver communicatively coupled to the processing device.

Example 7: The radar system of any of Examples 1-6, wherein the frequency multiplier passes the frequency-modulated radar signal to the transmitter and the processing device such that the frequency-modulated radar signal as received by the transmitter is in phase with the frequency-modulated radar signal as received by the processing device.

Example 8: The radar system of any of Examples 1-7, wherein the frequency multiplier comprises at least (1) a first frequency multiplier positioned between the signal generator and the processing device and (2) a second frequency multiplier positioned between the signal generator and the transmitter.

Example 9: The radar system of any of Examples 1-8, wherein the processing device calculates the distance between the transponder and the receiver based at least in part on calculating a beat frequency that (1) corresponds to a difference between an instantaneous frequency of the frequency-modulated radar signal received at the processing device and an instantaneous frequency of the signal returned from the transponder and (2) is proportional to the distance between the transponder and the receiver.

Example 10: The radar system of any of Examples 1-9, wherein the frequency-modulated radar signal traverses a greater distance between the signal generator and the frequency multiplier than between the frequency multiplier and the transmitter.

Example 11: The radar system of any of Examples 1-10, further comprising a power amplifier that (1) is positioned between the clock multiplier and the transmitter, (2) receives the frequency-modulated radar signal from the frequency multiplier, and (3) after amplifying a power level of the frequency-modulated radar signal by a certain amount, passes the frequency-modulated radar signal to the transmitter.

Example 12: The radar system of any of Examples 1-11, further comprising a delay mechanism that (1) is positioned between the signal generator and the frequency multiplier, (2) receives the frequency-modulated radar signal from the signal generator, and (3) after a certain period of delay, passes the frequency-modulated radar signal to the transmitter.

Example 13: The radar system of any of Examples 1-12, wherein the processing device further determines, based at least in part on the distance between the transponder and the receiver, a current three-dimensional location of at least a portion of a user wearing the wearable device.

Example 14: The radar system of Example 13, wherein (1) the processing device further passes the current three-dimensional location of the portion of the user to an artificial reality system that provides virtual content to the user and (2) the artificial reality system modifies at least one virtual component of the artificial reality system to account for the current physical location of the portion of the user.

Example 15: An artificial reality system that includes a radar mechanism comprising a transmitter and at least one receiver. The artificial reality system may also include a signal generator that generates a frequency-modulated radar signal. In addition, the radar system may include at least one frequency multiplier that, after multiplying a frequency of the frequency-modulated radar signal by a certain factor, synchronously passes the frequency-modulated radar signal to (1) the transmitter to be transmitted to at least one transponder located on a wearable device and (2) a processing device communicatively coupled to the receiver. The processing device may (1) detect a signal returned to the receiver from the transponder in response to the frequency-modulated radar signal and (2) calculate a distance between the transponder and the receiver based at least in part on an analysis of the signal returned from the transponder and the frequency-modulated radar signal received from the frequency multiplier.

Example 16: The artificial reality system of Example 15, further comprising an additional wearable device that secures at least the transmitter, the receiver, the signal generator, and the frequency multiplier.

Example 17: The artificial reality system of Example 16, wherein the receiver comprises a plurality of receivers that are secured to the additional wearable device such that each of the plurality of receivers are separated by at least a certain distance.

Example 18: The artificial reality system of Example 17, wherein the processing device comprises a plurality of processing devices that are each communicatively coupled to one of the plurality of receivers.

Example 19: The artificial reality system of Example 18, wherein the frequency multiplier comprises a plurality of frequency multipliers that each synchronously pass the frequency-modulated radar signal to one of the plurality of receivers.

Example 20: A method for radar-based artificial reality tracking may include (1) generating a frequency-modulated radar signal, (2) passing the frequency-modulated radar signal to at least one frequency multiplier that, after multiplying a frequency of the frequency-modulated radar signal by a certain factor, synchronously passes the frequency-modulated radar signal to at least (A) a transmitter to be transmitted to at least one transponder located on a wearable device and (B) a processing device communicatively coupled to a receiver, (3) detecting a signal returned to the receiver from the transponder in response to the frequency-modulated radar signal, and (4) calculating a distance between the transponder and the receiver based at least in part on an analysis of the signal returned from the transponder and the frequency-modulated radar signal received from the frequency multiplier.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1200 in FIG. 12) or that visually immerses a user in an artificial reality (such as, e.g., virtual-reality system 1300 in FIG. 13). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 12:
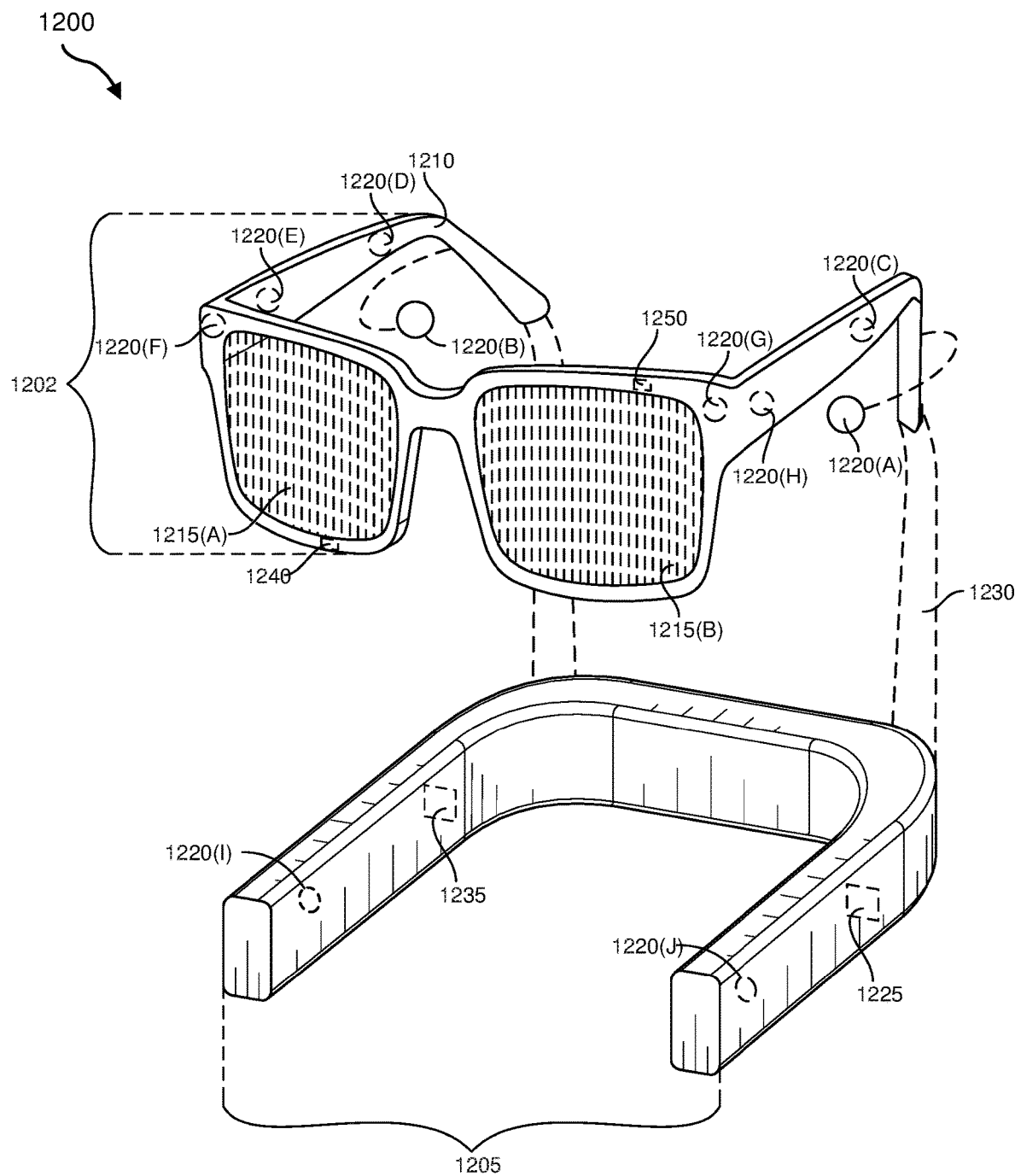
FIG. 12 is an illustration of exemplary augmented-reality glasses that may be used in connection with embodiments of this disclosure.

Turning to FIG. 12, augmented-reality system 1200 may include an eyewear device 1202 with a frame 1210 configured to hold a left display device 1215(A) and a right display device 1215(B) in front of a user's eyes. Display devices 1215(A) and 1215(B) may act together or independently to present an image or series of images to a user. While augmented-reality system 1200 includes two displays, embodiments of this disclosure may be implemented in augmented-reality systems with a single NED or more than two NEDs.

In some embodiments, augmented-reality system 1200 may include one or more sensors, such as sensor 1240. Sensor 1240 may generate measurement signals in response to motion of augmented-reality system 1200 and may be located on substantially any portion of frame 1210. Sensor 1240 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1200 may or may not include sensor 1240 or may include more than one sensor. In embodiments in which sensor 1240 includes an IMU, the IMU may generate calibration data based on measurement signals from sensor 1240. Examples of sensor 1240 may include, without limitation, accelerometers, gyroscopes, magnetometers, other suitable types of sensors that detect motion, sensors used for error correction of the IMU, or some combination thereof.

In some examples, augmented-reality system 1200 may also include a microphone array with a plurality of acoustic transducers 1220(A)-1220(J), referred to collectively as acoustic transducers 1220. Acoustic transducers 1220 may represent transducers that detect air pressure variations induced by sound waves. Each acoustic transducer 1220 may be configured to detect sound and convert the detected sound into an electronic format (e.g., an analog or digital format). The microphone array in FIG. 13 may include, for example, ten acoustic transducers: 1220(A) and 1220(B), which may be designed to be placed inside a corresponding ear of the user, acoustic transducers 1220(C), 1220(D), 1220(E), 1220(F), 1220(G), and 1220(H), which may be positioned at various locations on frame 1210, and/or acoustic transducers 1220(I) and 1220(J), which may be positioned on a corresponding neckband 1205.

In some embodiments, one or more of acoustic transducers 1220(A)-(F) may be used as output transducers (e.g., speakers). For example, acoustic transducers 1220(A) and/or 1220(B) may be earbuds or any other suitable type of headphone or speaker.

The configuration of acoustic transducers 1220 of the microphone array may vary. While augmented-reality system 1200 is shown in FIG. 12 as having ten acoustic transducers 1220, the number of acoustic transducers 1220 may be greater or less than ten. In some embodiments, using higher numbers of acoustic transducers 1220 may increase the amount of audio information collected and/or the sensitivity and accuracy of the audio information. In contrast, using a lower number of acoustic transducers 1220 may decrease the computing power required by an associated controller 1250 to process the collected audio information. In addition, the position of each acoustic transducer 1220 of the microphone array may vary. For example, the position of an acoustic transducer 1220 may include a defined position on the user, a defined coordinate on frame 1210, an orientation associated with each acoustic transducer 1220, or some combination thereof.

Acoustic transducers 1220(A) and 1220(B) may be positioned on different parts of the user's ear, such as behind the pinna, behind the tragus, and/or within the auricle or fossa. Or, there may be additional acoustic transducers 1220 on or surrounding the ear in addition to acoustic transducers 1220 inside the ear canal. Having an acoustic transducer 1220 positioned next to an ear canal of a user may enable the microphone array to collect information on how sounds arrive at the ear canal. By positioning at least two of acoustic transducers 1220 on either side of a user's head (e.g., as binaural microphones), augmented-reality device 1200 may simulate binaural hearing and capture a 3D stereo sound field around about a user's head. In some embodiments, acoustic transducers 1220(A) and 1220(B) may be connected to augmented-reality system 1200 via a wired connection 1230, and in other embodiments acoustic transducers 1220(A) and 1220(B) may be connected to augmented-reality system 1200 via a wireless connection (e.g., a Bluetooth connection). In still other embodiments, acoustic transducers 1220(A) and 1220(B) may not be used at all in conjunction with augmented-reality system 1200.

Acoustic transducers 1220 on frame 1210 may be positioned in a variety of different ways, including along the length of the temples, across the bridge, above or below display devices 1215(A) and 1215(B), or some combination thereof. Acoustic transducers 1220 may also be oriented such that the microphone array is able to detect sounds in a wide range of directions surrounding the user wearing the augmented-reality system 1200. In some embodiments, an optimization process may be performed during manufacturing of augmented-reality system 1200 to determine relative positioning of each acoustic transducer 1220 in the microphone array.

In some examples, augmented-reality system 1200 may include or be connected to an external device (e.g., a paired device), such as neckband 1205. Neckband 1205 generally represents any type or form of paired device. Thus, the following discussion of neckband 1205 may also apply to various other paired devices, such as charging cases, smart watches, smart phones, wrist bands, other wearable devices, hand-held controllers, tablet computers, laptop computers, other external compute devices, etc.

As shown, neckband 1205 may be coupled to eyewear device 1202 via one or more connectors. The connectors may be wired or wireless and may include electrical and/or non-electrical (e.g., structural) components. In some cases, eyewear device 1202 and neckband 1205 may operate independently without any wired or wireless connection between them. While FIG. 12 illustrates the components of eyewear device 1202 and neckband 1205 in example locations on eyewear device 1202 and neckband 1205, the components may be located elsewhere and/or distributed differently on eyewear device 1202 and/or neckband 1205. In some embodiments, the components of eyewear device 1202 and neckband 1205 may be located on one or more additional peripheral devices paired with eyewear device 1202, neckband 1205, or some combination thereof.

Pairing external devices, such as neckband 1205, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1200 may be provided by a paired device or shared between a paired device and an eyewear device, thus reducing the weight, heat profile, and form factor of the eyewear device overall while still retaining desired functionality. For example, neckband 1205 may allow components that would otherwise be included on an eyewear device to be included in neckband 1205 since users may tolerate a heavier weight load on their shoulders than they would tolerate on their heads. Neckband 1205 may also have a larger surface area over which to diffuse and disperse heat to the ambient environment. Thus, neckband 1205 may allow for greater battery and computation capacity than might otherwise have been possible on a stand-alone eyewear device. Since weight carried in neckband 1205 may be less invasive to a user than weight carried in eyewear device 1202, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1205 may be communicatively coupled with eyewear device 1202 and/or to other devices. These other devices may provide certain functions (e.g., tracking, localizing, depth mapping, processing, storage, etc.) to augmented-reality system 1200. In the embodiment of FIG. 12, neckband 1205 may include two acoustic transducers (e.g., 1220(I) and 1220(J)) that are part of the microphone array (or potentially form their own microphone subarray). Neckband 1205 may also include a controller 1225 and a power source 1235.

Acoustic transducers 1220(I) and 1220(J) of neckband 1205 may be configured to detect sound and convert the detected sound into an electronic format (analog or digital). In the embodiment of FIG. 12, acoustic transducers 1220(I) and 1220(J) may be positioned on neckband 1205, thereby increasing the distance between the neckband acoustic transducers 1220(I) and 1220(J) and other acoustic transducers 1220 positioned on eyewear device 1202. In some cases, increasing the distance between acoustic transducers 1220 of the microphone array may improve the accuracy of beamforming performed via the microphone array. For example, if a sound is detected by acoustic transducers 1220(C) and 1220(D) and the distance between acoustic transducers 1220(C) and 1220(D) is greater than, e.g., the distance between acoustic transducers 1220(D) and 1220(E), the determined source location of the detected sound may be more accurate than if the sound had been detected by acoustic transducers 1220(D) and 1220(E).

Controller 1225 of neckband 1205 may process information generated by the sensors on neckband 1205 and/or augmented-reality system 1200. For example, controller 1225 may process information from the microphone array that describes sounds detected by the microphone array. For each detected sound, controller 1225 may perform a direction-of-arrival (DOA) estimation to estimate a direction from which the detected sound arrived at the microphone array. As the microphone array detects sounds, controller 1225 may populate an audio data set with the information. In embodiments in which augmented-reality system 1200 includes an inertial measurement unit, controller 1225 may compute all inertial and spatial calculations from the IMU located on eyewear device 1202. A connector may convey information between augmented-reality system 1200 and neckband 1205 and between augmented-reality system 1200 and controller 1225. The information may be in the form of optical data, electrical data, wireless data, or any other transmittable data form. Moving the processing of information generated by augmented-reality system 1200 to neckband 1205 may reduce weight and heat in eyewear device 1202, making it more comfortable to the user.

Power source 1235 in neckband 1205 may provide power to eyewear device 1202 and/or to neckband 1205. Power source 1235 may include, without limitation, lithium ion batteries, lithium-polymer batteries, primary lithium batteries, alkaline batteries, or any other form of power storage. In some cases, power source 1235 may be a wired power source. Including power source 1235 on neckband 1205 instead of on eyewear device 1202 may help better distribute the weight and heat generated by power source 1235.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1300 in FIG. 13, that mostly or completely covers a user's field of view. Virtual-reality system 1300 may include a front rigid body 1302 and a band 1304 shaped to fit around a user's head. Virtual-reality system 1300 may also include output audio transducers 1306(A) and 1306(B). Furthermore, while not shown in FIG. 13, front rigid body 1302 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1200 and/or virtual-reality system 1300 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 1200 and/or virtual-reality system 1300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1200 and/or virtual-reality system 1300 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 1200 and 1300 of FIGS. 12 and 13, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

As noted, artificial-reality systems 1200 and 1300 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 14:
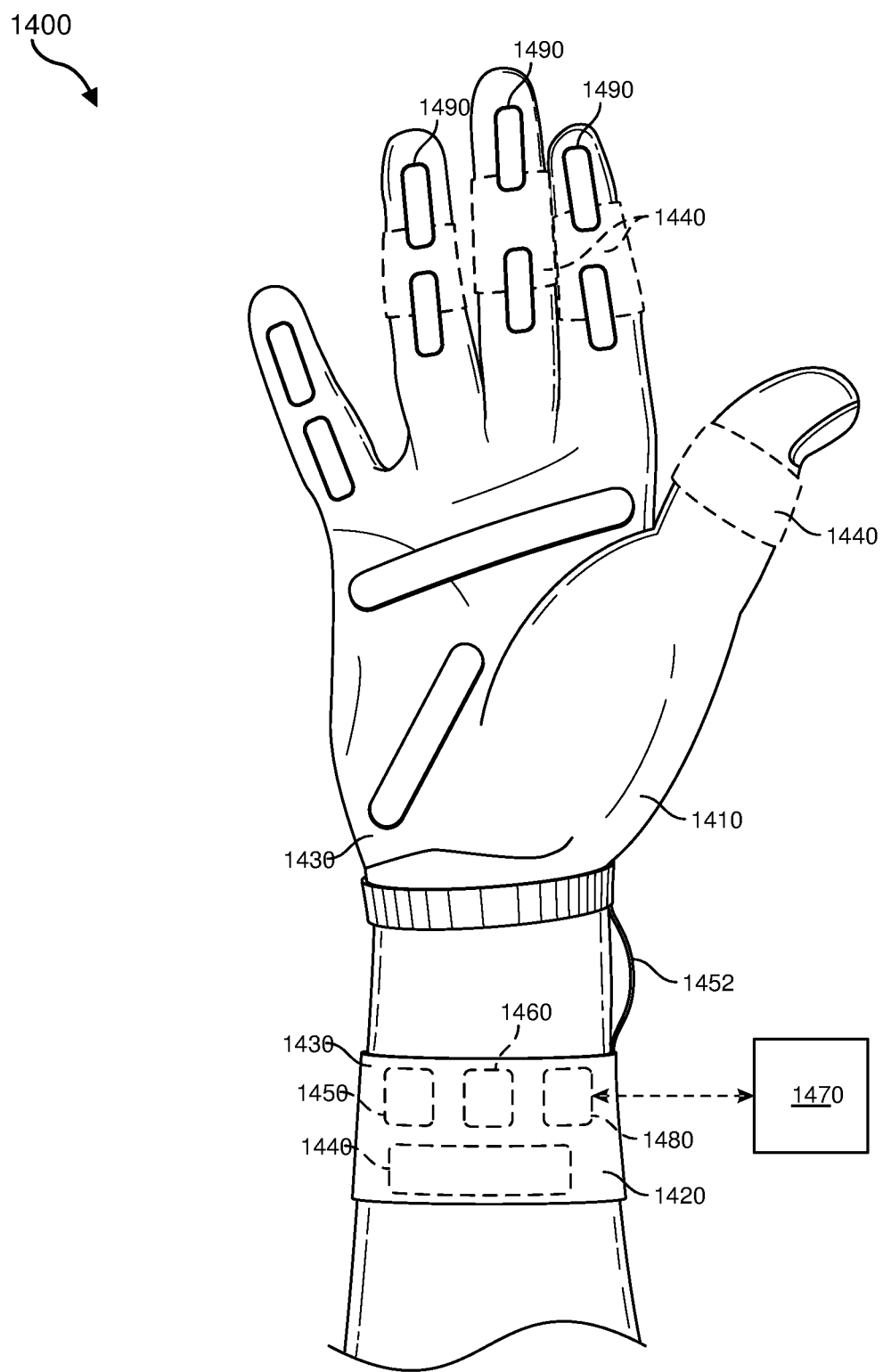
FIG. 14 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 14 illustrates a vibrotactile system 1400 in the form of a wearable glove (haptic device 1410) and wristband (haptic device 1420). Haptic device 1410 and haptic device 1420 are shown as examples of wearable devices that include a flexible, wearable textile material 1430 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1440 may be positioned at least partially within one or more corresponding pockets formed in textile material 1430 of vibrotactile system 1400. Vibrotactile devices 1440 may be positioned in locations to provide a vibrating sensation (e.g., haptic feedback) to a user of vibrotactile system 1400. For example, vibrotactile devices 1440 may be positioned against the user's finger(s), thumb, or wrist, as shown in FIG. 14. Vibrotactile devices 1440 may, in some examples, be sufficiently flexible to conform to or bend with the user's corresponding body part(s).

A power source 1450 (e.g., a battery) for applying a voltage to the vibrotactile devices 1440 for activation thereof may be electrically coupled to vibrotactile devices 1440, such as via conductive wiring 1452. In some examples, each of vibrotactile devices 1440 may be independently electrically coupled to power source 1450 for individual activation. In some embodiments, a processor 1460 may be operatively coupled to power source 1450 and configured (e.g., programmed) to control activation of vibrotactile devices 1440.

Vibrotactile system 1400 may be implemented in a variety of ways. In some examples, vibrotactile system 1400 may be a standalone system with integral subsystems and components for operation independent of other devices and systems. As another example, vibrotactile system 1400 may be configured for interaction with another device or system 1470. For example, vibrotactile system 1400 may, in some examples, include a communications interface 1480 for receiving and/or sending signals to the other device or system 1470. The other device or system 1470 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1480 may enable communications between vibrotactile system 1400 and the other device or system 1470 via a wireless (e.g., Wi-Fi, Bluetooth, cellular, radio, etc.) link or a wired link. If present, communications interface 1480 may be in communication with processor 1460, such as to provide a signal to processor 1460 to activate or deactivate one or more of the vibrotactile devices 1440.

Vibrotactile system 1400 may optionally include other subsystems and components, such as touch-sensitive pads 1490, pressure sensors, motion sensors, position sensors, lighting elements, and/or user interface elements (e.g., an on/off button, a vibration control element, etc.). During use, vibrotactile devices 1440 may be configured to be activated for a variety of different reasons, such as in response to the user's interaction with user interface elements, a signal from the motion or position sensors, a signal from the touch-sensitive pads 1490, a signal from the pressure sensors, a signal from the other device or system 1470, etc.

Although power source 1450, processor 1460, and communications interface 1480 are illustrated in FIG. 14 as being positioned in haptic device 1420, the present disclosure is not so limited. For example, one or more of power source 1450, processor 1460, or communications interface 1480 may be positioned within haptic device 1410 or within another wearable textile.

Figure 15:
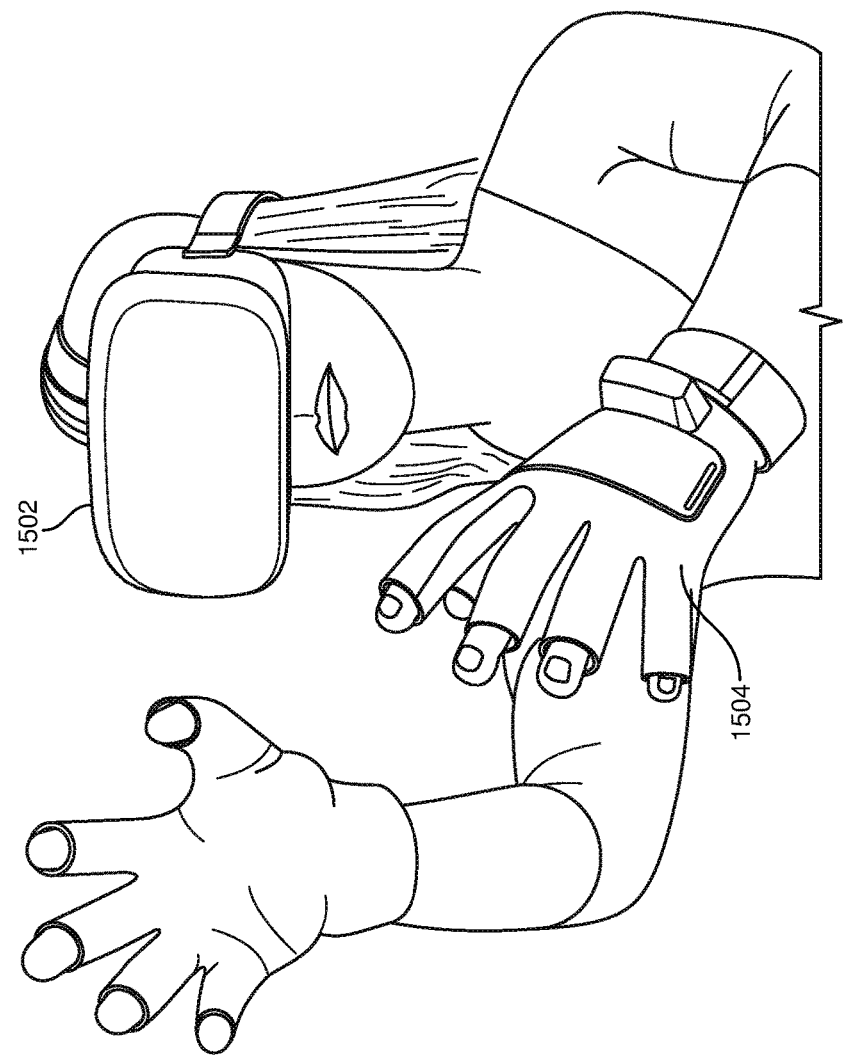
FIG. 15 is an illustration of an exemplary virtual-reality environment according to embodiments of this disclosure.

Haptic wearables, such as those shown in and described in connection with FIG. 14, may be implemented in a variety of types of artificial-reality systems and environments. FIG. 15 shows an example artificial-reality environment 1500 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 13:
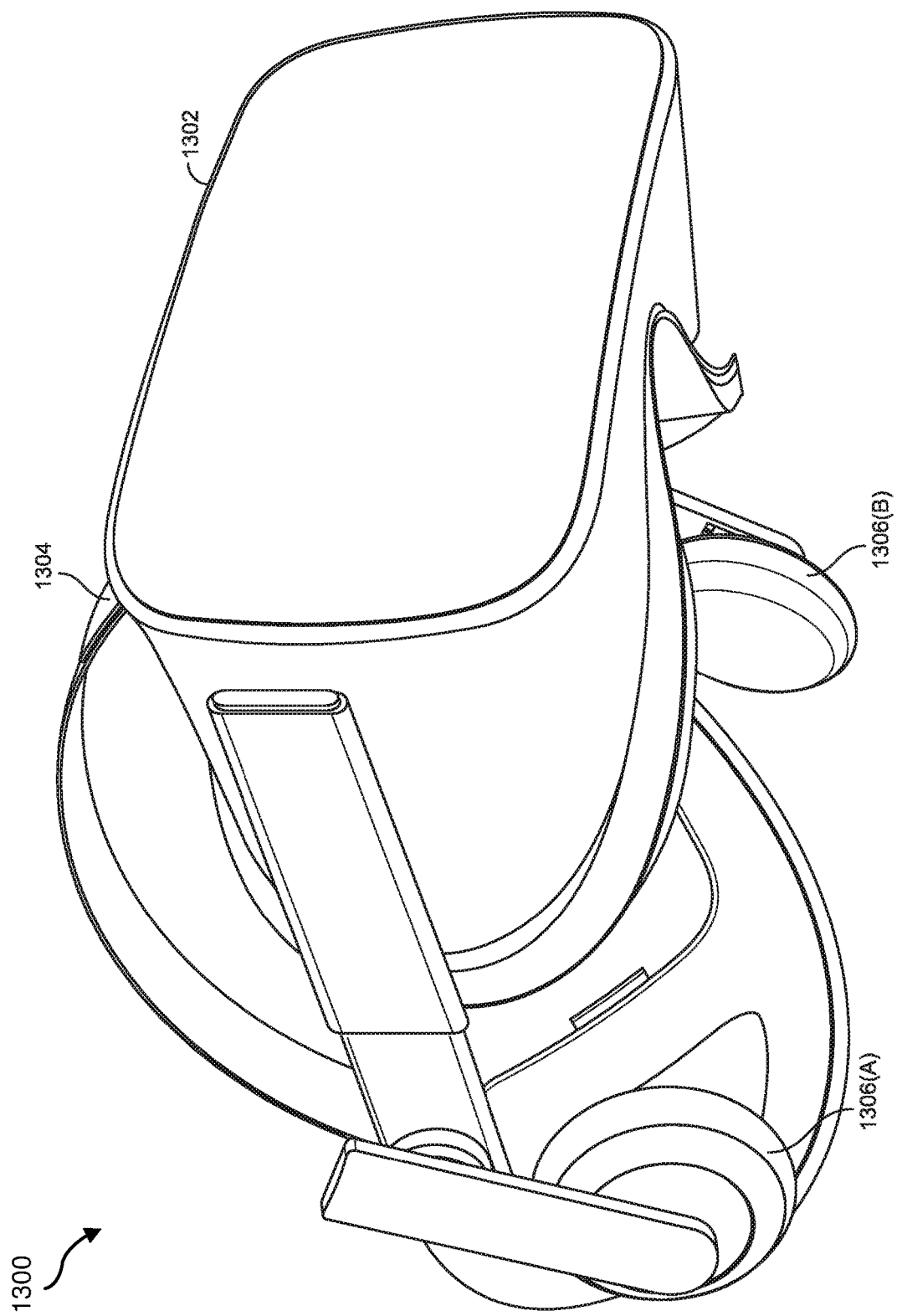
FIG. 13 is an illustration of an exemplary virtual-reality headset that may be used in connection with embodiments of this disclosure.

Head-mounted display 1502 generally represents any type or form of virtual-reality system, such as virtual-reality system 1300 in FIG. 13. Haptic device 1504 generally represents any type or form of wearable device, worn by a user of an artificial-reality system, that provides haptic feedback to the user to give the user the perception that he or she is physically engaging with a virtual object. In some embodiments, haptic device 1504 may provide haptic feedback by applying vibration, motion, and/or force to the user. For example, haptic device 1504 may limit or augment a user's movement. To give a specific example, haptic device 1504 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1504 to send action requests to a console. Examples of action requests include, without limitation, requests to start an application and/or end the application and/or requests to perform a particular action within the application.

Figure 16:
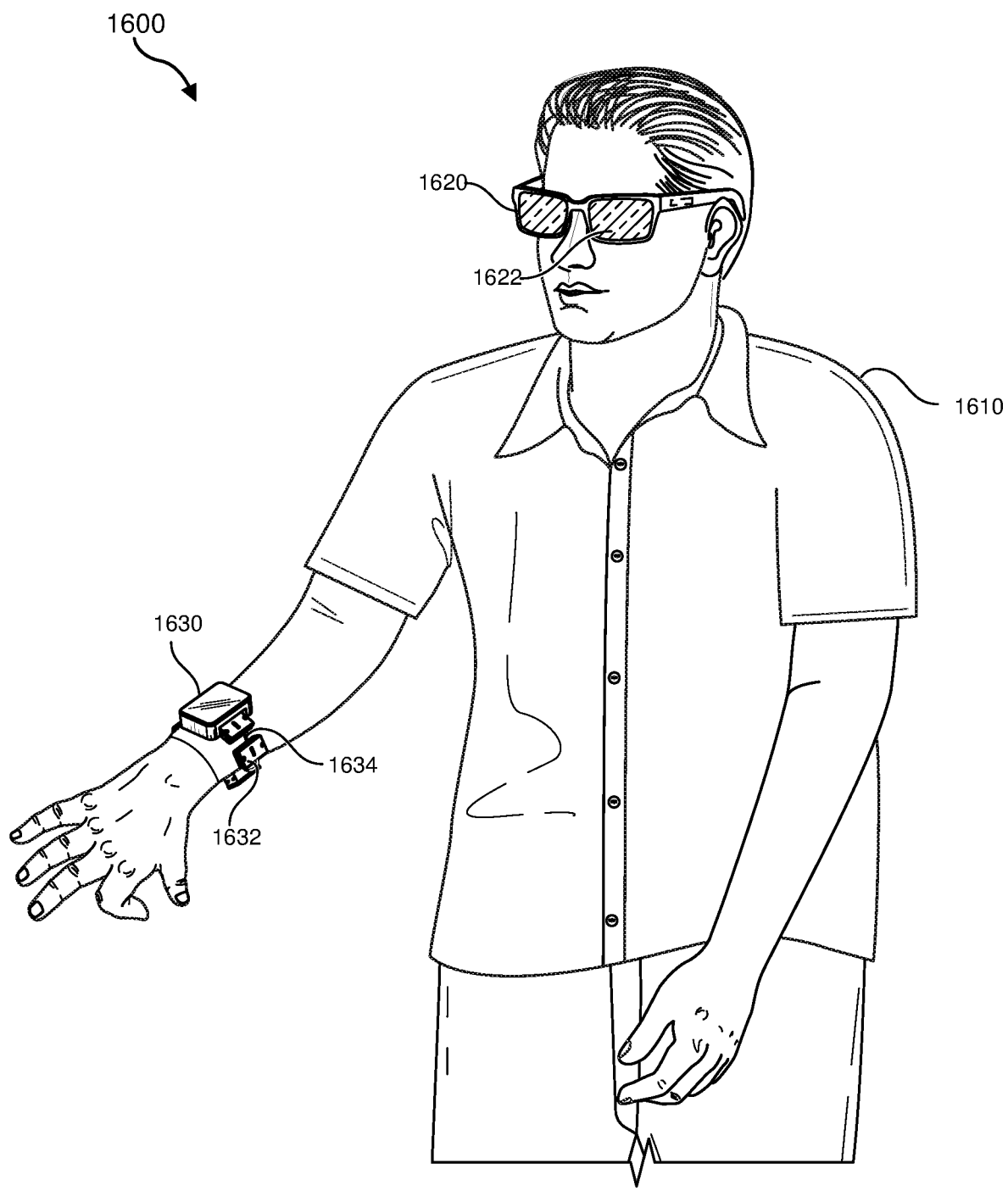
FIG. 16 is an illustration of an exemplary augmented-reality environment according to embodiments of this disclosure.

While haptic interfaces may be used with virtual-reality systems, as shown in FIG. 15, haptic interfaces may also be used with augmented-reality systems, as shown in FIG. 16. FIG. 16 is a perspective view of a user 1610 interacting with an augmented-reality system 1600. In this example, user 1610 may wear a pair of augmented-reality glasses 1620 that may have one or more displays 1622 and that are paired with a haptic device 1630. In this example, haptic device 1630 may be a wristband that includes a plurality of band elements 1632 and a tensioning mechanism 1634 that connects band elements 1632 to one another.

One or more of band elements 1632 may include any type or form of actuator suitable for providing haptic feedback. For example, one or more of band elements 1632 may be configured to provide one or more of various types of cutaneous feedback, including vibration, force, traction, texture, and/or temperature. To provide such feedback, band elements 1632 may include one or more of various types of actuators. In one example, each of band elements 1632 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1410, 1420, 1504, and 1630 may include any suitable number and/or type of haptic transducer, sensor, and/or feedback mechanism. For example, haptic devices 1410, 1420, 1504, and 1630 may include one or more mechanical transducers, piezoelectric transducers, and/or fluidic transducers. Haptic devices 1410, 1420, 1504, and 1630 may also include various combinations of different types and forms of transducers that work together or independently to enhance a user's artificial-reality experience. In one example, each of band elements 1632 of haptic device 1630 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A radar system comprising:
   a radar mechanism comprising at least one transmitter and at least one receiver;
   a signal generator that generates a frequency-modulated radar signal; and
   at least one frequency multiplier that, after multiplying a frequency of the frequency-modulated radar signal by a certain factor, synchronously passes the frequency-modulated radar signal to at least:
   the transmitter to be transmitted to at least one transponder located on a wearable device; and
   a processing device communicatively coupled to the receiver, wherein:
   the frequency-modulated radar signal as received by the transmitter is in phase with the frequency-modulated radar signal as received by the processing device; and
   the processing device:
   detects a signal returned to the receiver from the transponder in response to the frequency-modulated radar signal; and
   calculates a distance between the transponder and the receiver based at least in part on an analysis of the signal returned from the transponder and the frequency-modulated radar signal received from the frequency multiplier.

2. The radar system of claim 1, further comprising an additional wearable device that secures at least:
   the transmitter;
   the receiver;
   the signal generator; and
   the frequency multiplier.

3. The radar system of claim 2, wherein the receiver comprises a plurality of receivers that are secured to the additional wearable device such that each of the plurality of receivers are separated by at least a certain distance.

4. The radar system of claim 3, wherein the processing device comprises a plurality of processing devices that are each communicatively coupled to one of the plurality of receivers.

5. The radar system of claim 4, wherein the frequency multiplier comprises a plurality of frequency multipliers that each synchronously pass the frequency-modulated radar signal to one of the plurality of processing devices.

6. The radar system of claim 4, wherein:
   the plurality of receivers each receive the signal returned from the transponder in response to the frequency-modulated radar signal; and
   each of the plurality of processing devices calculates a distance between the transponder and the receiver communicatively coupled to the processing device.

7. The radar system of claim 1, wherein the frequency multiplier comprises at least:
   a first frequency multiplier positioned between the signal generator and the processing device; and
   a second frequency multiplier positioned between the signal generator and the transmitter.

8. The radar system of claim 1, wherein the processing device calculates the distance between the transponder and the receiver based at least in part on calculating a beat frequency that:
   corresponds to a difference between an instantaneous frequency of the frequency-modulated radar signal received at the processing device and an instantaneous frequency of the signal returned from the transponder; and
   is proportional to the distance between the transponder and the receiver.

9. The radar system of claim 1, wherein the frequency-modulated radar signal traverses a greater distance between the signal generator and the frequency multiplier than between the frequency multiplier and the transmitter.

10. The radar system of claim 1, further comprising a power amplifier that:
    is positioned between the frequency multiplier and the transmitter;
    receives the frequency-modulated radar signal from the frequency multiplier; and
    after amplifying a power level of the frequency-modulated radar signal by a certain amount, passes the frequency-modulated radar signal to the transmitter.

11. The radar system of claim 1, further comprising a delay mechanism that:
    is positioned between the signal generator and the frequency multiplier;
    receives the frequency-modulated radar signal from the signal generator; and
    after a certain period of delay, passes the frequency-modulated radar signal to the transmitter.

12. The radar system of claim 1, wherein the processing device further determines, based at least in part on the distance between the transponder and the receiver, a current three-dimensional location of at least a portion of a user wearing the wearable device.

13. The radar system of claim 12, wherein:

the processing device further passes the current three-dimensional location of the portion of the user to an artificial reality system that provides virtual content to the user; and the artificial reality system modifies at least one virtual component of the artificial reality system to account for the current three-dimensional location of the portion of the user.

14. An artificial reality system comprising:

a radar mechanism comprising at least one transmitter and at least one receiver;

a signal generator that generates a frequency-modulated radar signal; and at least one frequency multiplier that, after multiplying a frequency of the frequency-modulated radar signal by a certain factor, synchronously passes the frequency-modulated radar signal to at least:

the transmitter to be transmitted to at least one transponder located on a wearable device; and a processing device communicatively coupled to the receiver, wherein:

the frequency-modulated radar signal as received by the transmitter is in phase with the frequency-modulated radar signal as received by the processing device; and the processing device:

detects a signal returned to the receiver from the transponder in response to the frequency-modulated radar signal; and calculates a distance between the transponder and the receiver based at least in part on an analysis of the signal returned from the transponder and the frequency-modulated radar signal received from the frequency multiplier.

15. The artificial reality system of claim 14, further comprising an additional wearable device that secures at least:

the transmitter;
the receiver;
the signal generator; and
the frequency multiplier.

16. The artificial reality system of claim 15, wherein the receiver comprises a plurality of receivers that are secured to the additional wearable device such that each of the plurality of receivers are separated by at least a certain distance.

17. The artificial reality system of claim 16, wherein the processing device comprises a plurality of processing devices that are each communicatively coupled to one of the plurality of receivers.

18. The artificial reality system of claim 17, wherein the frequency multiplier comprises a plurality of frequency multipliers that each synchronously pass the frequency-modulated radar signal to one of the plurality of processing devices.

19. A method comprising:

generating a frequency-modulated radar signal;

passing the frequency-modulated radar signal to at least one frequency multiplier that, after multiplying a frequency of the frequency-modulated radar signal by a certain factor, synchronously passes the frequency-modulated radar signal to at least:

a transmitter to be transmitted to at least one transponder located on a wearable device; and a processing device communicatively coupled to a receiver, wherein the frequency-modulated radar signal as received by the transmitter is in phase with the frequency-modulated radar signal as received by the processing device;

detecting a signal returned to the receiver from the transponder in response to the frequency-modulated radar signal; and calculating a distance between the transponder and the receiver based at least in part on an analysis of the signal returned from the transponder and the frequency-modulated radar signal received from the frequency multiplier.

* * * * *